US011709826B2

(12) United States Patent  
Okamura et al.

(10) Patent No.: US 11,709,826 B2  
(45) Date of Patent: Jul. 25, 2023

(54) CONTROL SYSTEM, CONTROL METHOD, AND CONTROL PROGRAM

(71) Applicant: OMRON CORPORATION, Kyoto (JP)

(72) Inventors: Kotaro Okamura, Kusatsu (JP); Yoshitaka Takeuchi, Otsu (JP); Tomonari Inui, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 126 days.

(21) Appl. No.: 17/434,935

(22) PCT Filed: Feb. 18, 2020

(86) PCT No.: PCT/JP2020/006259  
§ 371 (c)(1),  
(2) Date: Aug. 30, 2021

(87) PCT Pub. No.: WO2020/189142  
PCT Pub. Date: Sep. 24, 2020

(65) Prior Publication Data  
US 2022/0147520 A1 May 12, 2022

(30) Foreign Application Priority Data  
Mar. 15, 2019 (JP) ................................ 2019-047877

(51) Int. Cl.  
G06F 16/242 (2019.01)  
G06F 16/2455 (2019.01)

(52) U.S. Cl.  
CPC .... G06F 16/2423 (2019.01); G06F 16/24552 (2019.01)

(58) Field of Classification Search  
CPC ........... G06F 16/2423; G06F 16/24552; G06F 11/0787; G06F 11/0727; G06F 11/079; G06F 16/2455; G06F 17/40; G05B 19/056  
See application file for complete search history.

(56) References Cited

U.S. PATENT DOCUMENTS 6,052,687 A * 4/2000 Miura .................... G06F 16/94  
2005/0097118 A1 5/2005 Slutz  
(Continued)

FOREIGN PATENT DOCUMENTS

EP 2 767 906 A1 8/2014  
EP 2 990 951 A1 3/2016  
(Continued)

OTHER PUBLICATIONS

Extended European Search Report dated Oct. 19, 2022 in European Application No. 20773918.6.  
(Continued)

Primary Examiner — Jorge A Casanova  
(74) Attorney, Agent, or Firm — Sughrue Mion, PLLC

(57) ABSTRACT

A control system includes an information processing device that communicates with a controller that controls a control target. The controller or the information processing device include a storage device that stores one or more SQL statements to be executed and an execution result the one or more SQL statements in association with each other as log data. The information processing device includes a display controller that displays on a display an SQL statement to be corrected that has an unsuccessful execution result; an operation unit that accepts a correction operation on the SQL statement and an execution operation; and a communication interface that sends an execution instruction to execute the corrected SQL statement to the controller upon receipt of the execution operation and to receive an execution result of the corrected SQL statement from the controller. The display controller displays an execution result of the corrected SQL statement.

18 Claims, 17 Drawing Sheets

(56) References Cited

U.S. PATENT DOCUMENTS

| | | | |
|---|---|---|---|
| 2014/0236997 A1 | 8/2014 | Okamura et al. | |
| 2016/0098028 A1 | 4/2016 | Tanide | |
| 2016/0147637 A1 | 5/2016 | Bhagavan | |
| 2016/0291564 A1 | 10/2016 | Okamura | |
| 2020/0201835 A1* | 6/2020 | Okamura | G06F 16/252 |
| 2022/0358102 A1* | 11/2022 | Koru | G06F 16/215 |

FOREIGN PATENT DOCUMENTS

| | | |
|---|---|---|
| JP | 2003-228586 A | 8/2003 |
| JP | 2014-157506 A | 8/2014 |
| JP | 2016-194808 A | 11/2016 |
| WO | 01/93105 A2 | 12/2001 |
| WO | 2014/184962 A1 | 11/2014 |

OTHER PUBLICATIONS

Toni Taipalus et al., "Errors and Complications in SQL Query Formulation", ACM Transactions on Computing Education, 2018, vol. 18, No. 3, Article 15, pp. 1-29 (29 pages total).

Hiroyuki Umeda, "System integrator, Oracle Development Support Tool 'SI Object Browser Ver 9.0'", DB Magazine, Jun. 1, 2005, pp. 206-209, vol. 15, No. 2.

International Search Report for PCT/JP2020/006259 dated Apr. 14, 2020 [PCT/ISA/210].

Written Opinion for PCT/JP2020/006259 dated Apr. 14, 2020 [PCT/ISA/237].

* cited by examiner

| COLUMN | USER PROGRAM | | TABLE NAME:TABLE1 | |
|---|---|---|---|---|
| | DATA TYPE | DATA RANGE | DATA TYPE | DATA RANGE |
| A | USING | 0~256 | NUMBER(3) | 0~100 |
| B | DINT | −2147483648~2147483648 | NUMBER(5) | 0~10000 |
| C | USINT | 0~256 | NUMBER(3) | 0~200 |

FIG.9
(S82)

LOG DATA SELECTION SCREEN — 121(100)

40

| EXECUTION LOG | SUCCESS LOG | ERROR LOG |

TB1 — 41

| ENTRY | DATE & TIME | CATEGORY | LOG CODE | LOG NAME | EXECUTION RESULT | ERROR CODE | CONNECTION NAME | SERIAL ID |
|---|---|---|---|---|---|---|---|---|
| 00001 | 2018/6/12 10:10:25.572 | SPOOL | 0001 | INSERT | 0x3014 | 22003 | MyDatabase1 | 0008835233 |
| 00002 | 2018/6/12 10:10:25.572 | STATUS_ERROR | 0002 | SELECT | 0x3011 | 08000 | MyDatabase1 | 0023875007 |
| 00003 | 2018/6/12 10:10:25.572 | SPOOL | 0003 | UPDATE | 0x3011 | 22003 | MyDatabase1 | 0000000010 |

DETAIL OF SQL STATEMENT

INSERT INTO Table1(Colum A, Colum B, Colum C)Values('200', '1500', '128')  — 52

45

46 — ENTER    CANCEL — 47

LOG DATA SELECTION SCREEN — 121(100)

40

41

| EXECUTION LOG | SUCCESS LOG | ERROR LOG |

TB2

| ENTRY | DATE & TIME | CATEGORY | LOG CODE | LOG NAME | EXECUTION RESULT | ERROR CODE | CONNECTION NAME | SERIAL ID |
|---|---|---|---|---|---|---|---|---|
| 00001 | 2018/6/12 10:9:12.869 | SPOOL | 0001 | INSERT | 0x0000 | — | MyDatabase1 | 000012253 |
| 00002 | 2018/6/12 10:9:12.869 | STATUS_ERROR | 0002 | SELECT | 0x0000 | — | MyDatabase1 | 0000008936 |
| 00003 | 2018/6/12 10:9:12.869 | SPOOL | 0003 | UPDATE | 0x0000 | — | MyDatabase1 | 0090102766 |

DETAIL OF SQL STATEMENT

52A

INSERT INTO Table1(Colum A, Colum B, Colum C)Values('90', '1500', '128')

45

46 — ENTER    CANCEL — 47

(S84)

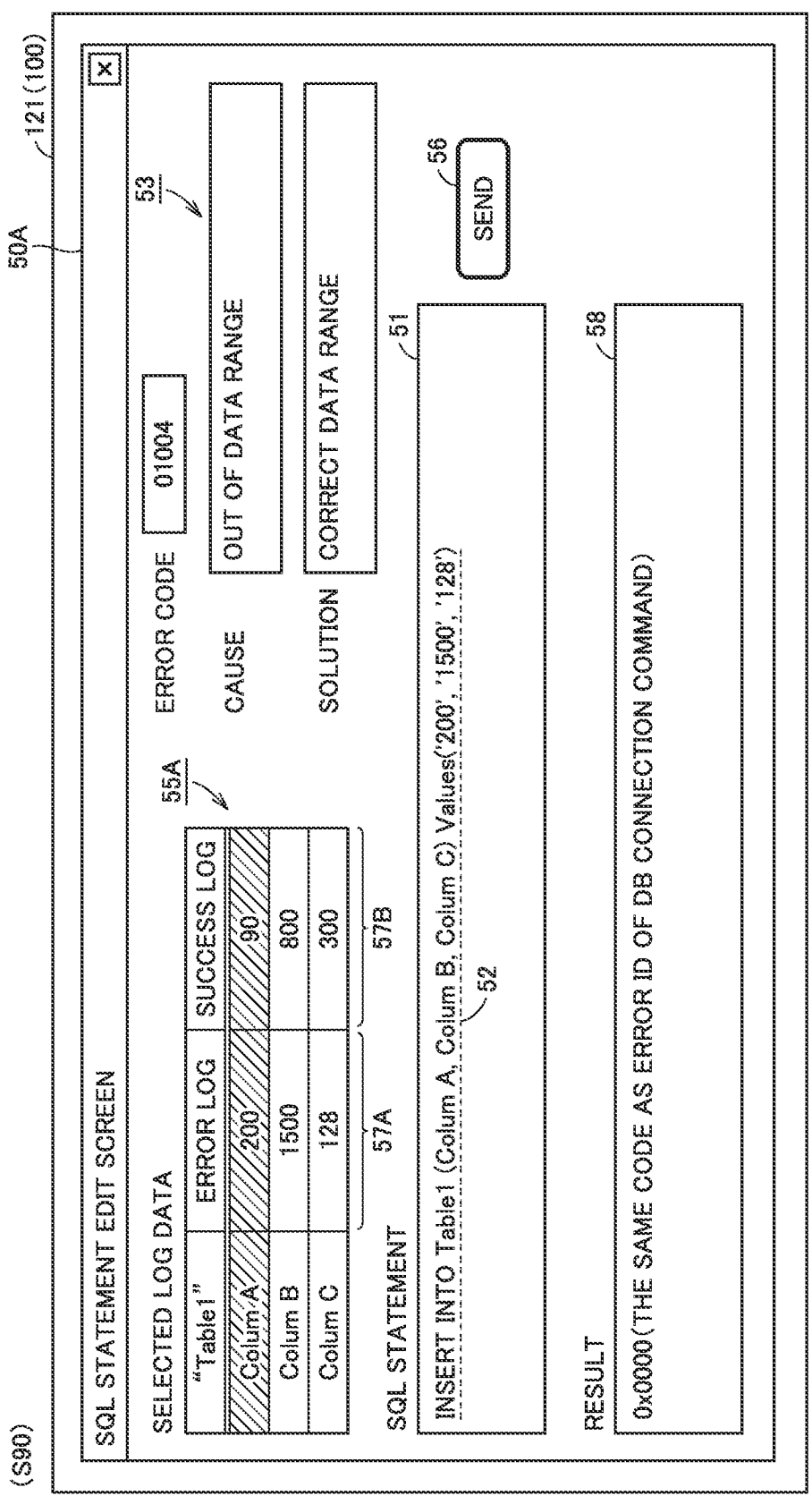

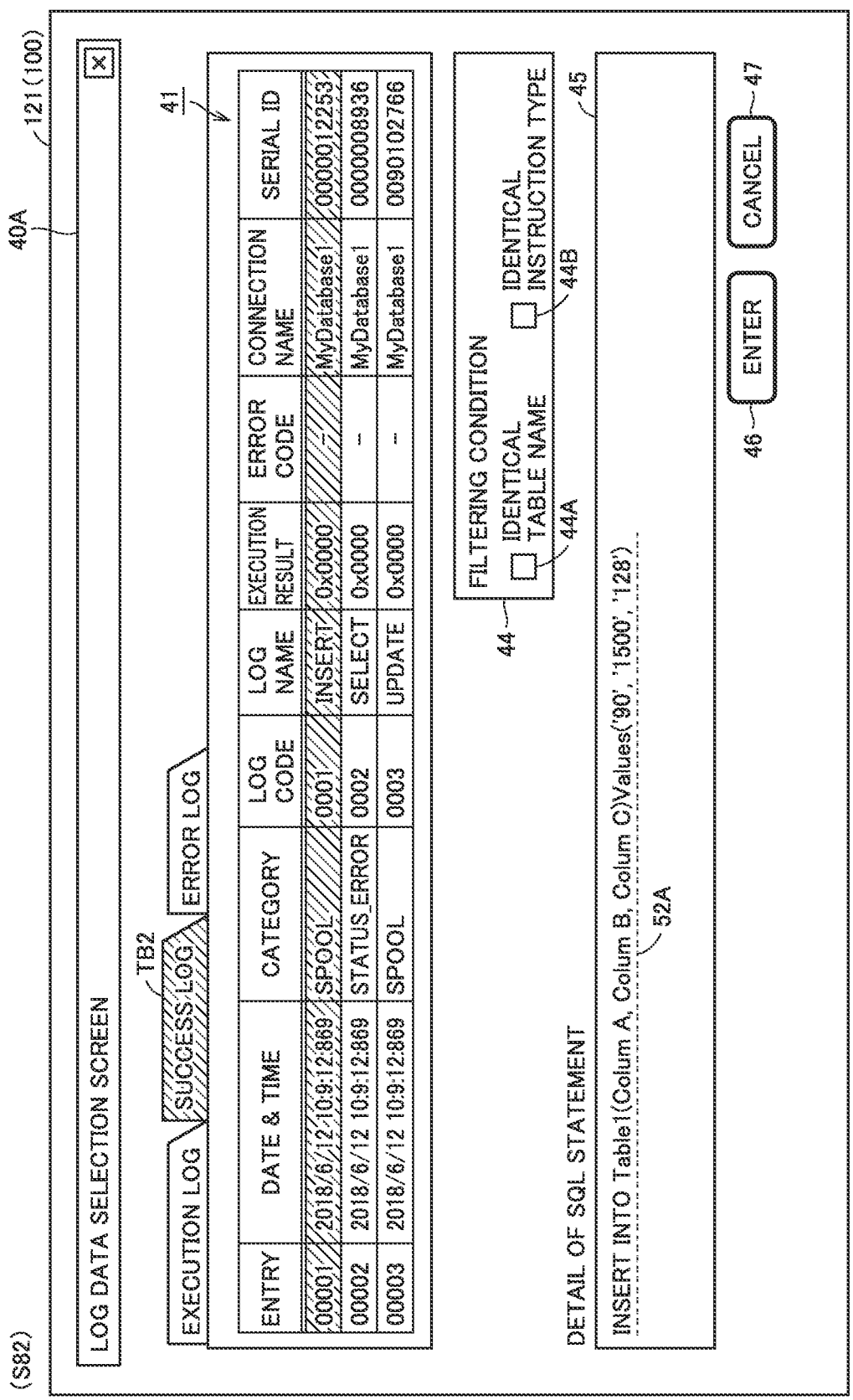

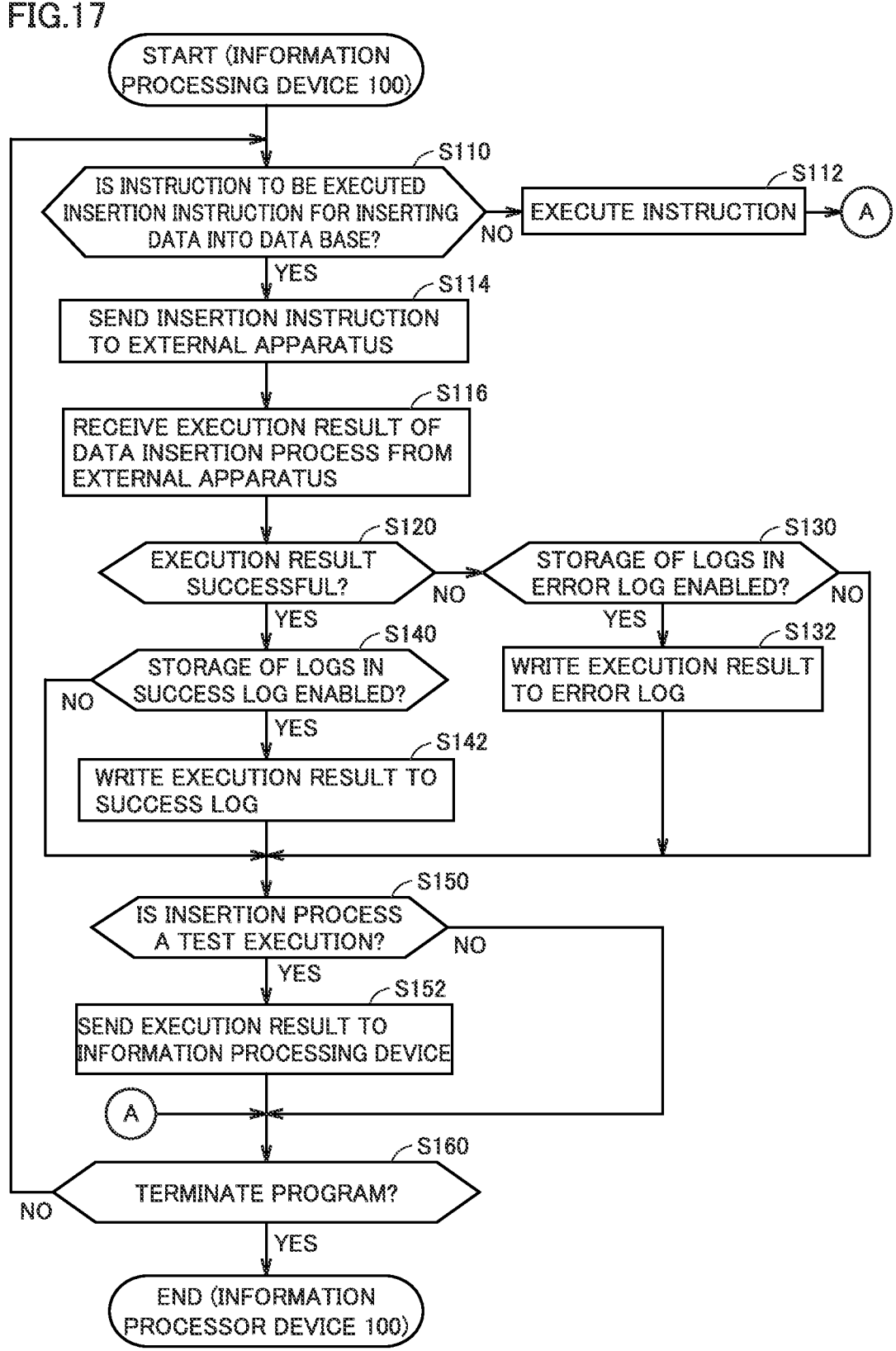

CONTROL SYSTEM, CONTROL METHOD, AND CONTROL PROGRAM

CROSS REFERENCE TO RELATED APPLICATIONS

This application is a National Stage of International Application No. PCT/JP2020/006259 filed Feb. 18, 2020, claiming priority based on Japanese Patent Application No. 2019-047877 filed Mar. 15, 2019, the entire contents of each of which being herein incorporated by reference in their entireties.

TECHNICAL FIELD

The present disclosure relates to a technique for generating tables on a data base to be accessed by a controller.

BACKGROUND ART

FA (Factory Automation) systems for automating production processes have become widespread in various production sites. The FA system includes an input apparatus, a drive apparatus, a controller, and the like. The controller controls the drive apparatus in accordance with inputs from various sensors as input devices. The drive apparatus includes, for example, a transporting plate for transporting a workpiece, a conveyor for conveying a workpiece, and an arm robot for transporting a workpiece to a predetermined target location.

In recent years, controllers capable of accessing a data base on an external apparatus have become widespread. As such a controller, Japanese Patent Laid-Open No. 2016-194808 (PTL 1) discloses a technique capable of operating a data base without the description of SQL and capable of collectively operating a plurality of records with a simple configuration. WO2014/184962 (PTL 2) discloses a controller capable of reducing the number of steps of reading data from a data base as compared with a conventional method.

CITATION LIST

Patent Literature

PTL 1: Japanese Patent Laid-Open No. 2016-194808
PTL 2: WO2014/184962

SUMMARY OF INVENTION

Technical Problem

Data related to a control target such as a drive apparatus is collected by a controller, and the collected data is sequentially added to the data base. At this time, the collected data may not be properly added to the data base due to some kinds of errors. In this case, the user needs to determine the cause of error and correct the SQL statement, the configuration or the like. The error may be caused by various factors, and depending on the type of errors, it is very difficult to determine the cause thereof. Accordingly, such a technique is desired that assists users in determining the cause of an error that occurs during the addition of collected data to a data base.

Solution to Problem

An embodiment of the present disclosure provides an information processing device configured to communicate with a controller configured to a control target. Any of the controller and the information processing device includes a storage device configured to store one or more SQL statements to be executed so as to insert data related to the control target into a data base and an execution result of each of the one or more SQL statements in association with each other as log data. The information processing device includes a display unit, a display control unit configured to display on the display unit an SQL statement to be corrected which is among the SQL statements included in the log data and has an unsuccessful execution result, an operation unit configured to accept a correction operation on the SQL statement to be corrected and an execution operation on the corrected SQL statement, and a communication unit configured to send an execution instruction to execute the corrected SQL statement to the controller upon receipt of the execution operation by the operation unit and to receive an execution result of the corrected SQL statement from the controller. The display control unit displays an execution result of the corrected SQL statement on the display unit.

According to an aspect of the present disclosure, the operation unit is further configured to accept an operation of selecting, from the SQL statements included in the log data, an SQL statement to be compared which has a successful execution result, and the display control unit displays the data inserted into the data base by the SQL statement to be corrected and the data inserted into the data base by the SQL statement to be compared side by side.

According to an aspect of the present disclosure, the display control unit displays a set of data satisfying a predetermined comparison condition among the entire data set composed of data inserted into the data base by the SQL statement to be corrected and data inserted into the data base by the SQL statement to be compared in a display mode different from the other data in the data set.

According to an aspect of the present disclosure, the predetermined comparison condition is satisfied when the number of digits is different between the data in the data set.

According to an aspect of the present disclosure, the display control unit displays on the display unit an SQL statement among the SQL statements included in the log data that matches a part of the SQL statement to be corrected as a candidate of the SQL statement to be compared, and the operation unit accepts a selection operation of selecting the SQL statement to be compared from the candidates.

According to an aspect of the present disclosure, the display control unit displays on the display unit an SQL statement among the SQL statements included in the log data that matches a table name defined in the SQL statement to be corrected as the candidate.

Another embodiment of the present disclosure provides a control method of an information processing device configured to communicate with a controller that controls a control target. Any of the controller and the information processing device includes a storage device configured to store one or more SQL statements to be executed so as to insert data related to the control target into a data base and an execution result of each of the one or more SQL statements in association with each other as log data. The control method includes: displaying on the display unit an SQL statement to be corrected which is among the SQL statements included in the log data and has an unsuccessful execution result; accepting a correction operation on the SQL statement to be corrected and an execution operation on the corrected SQL statement; sending an execution instruction to execute the corrected SQL statement to the controller upon receipt of the execution operation and receiving from the controller an execution result of the corrected SQL statement; and displaying an execution result of the corrected SQL statement on the display unit.

Another embodiment of the present disclosure provides a control program for an information processing device configured to communicate with a controller that controls a control target. Any of the controller and the information processing device includes a storage device configured to store one or more SQL statements to be executed so as to insert data related to the control target into a data base and an execution result of each of the one or more SQL statements in association with each other as log data. The control program causes the information processing device to perform: displaying on the display unit an SQL statement to be corrected which is among the SQL statements included in the log data and has an unsuccessful execution result; accepting a correction operation on the SQL statement to be corrected and an execution operation on the corrected SQL statement; sending an execution instruction to execute the corrected SQL statement to the controller upon receipt of the execution operation and receiving from the controller an execution result of the corrected SQL statement; and displaying an execution result of the corrected SQL statement on the display unit.

BRIEF DESCRIPTION OF DRAWINGS

FIG. 7 is a diagram illustrating an example of configuration information;

FIG. 9 is a diagram illustrating an error log selection screen;

FIG. 13 is a diagram illustrating a success log selection screen;

FIG. 15 is a diagram illustrating an edit screen according to a modification;

FIG. 16 is a diagram illustrating a selection screen according to a modification; and FIG. 17 is a flowchart illustrating a part of a process to be executed by the information processing device according to an embodiment.

DESCRIPTION OF EMBODIMENTS

Figure 1:
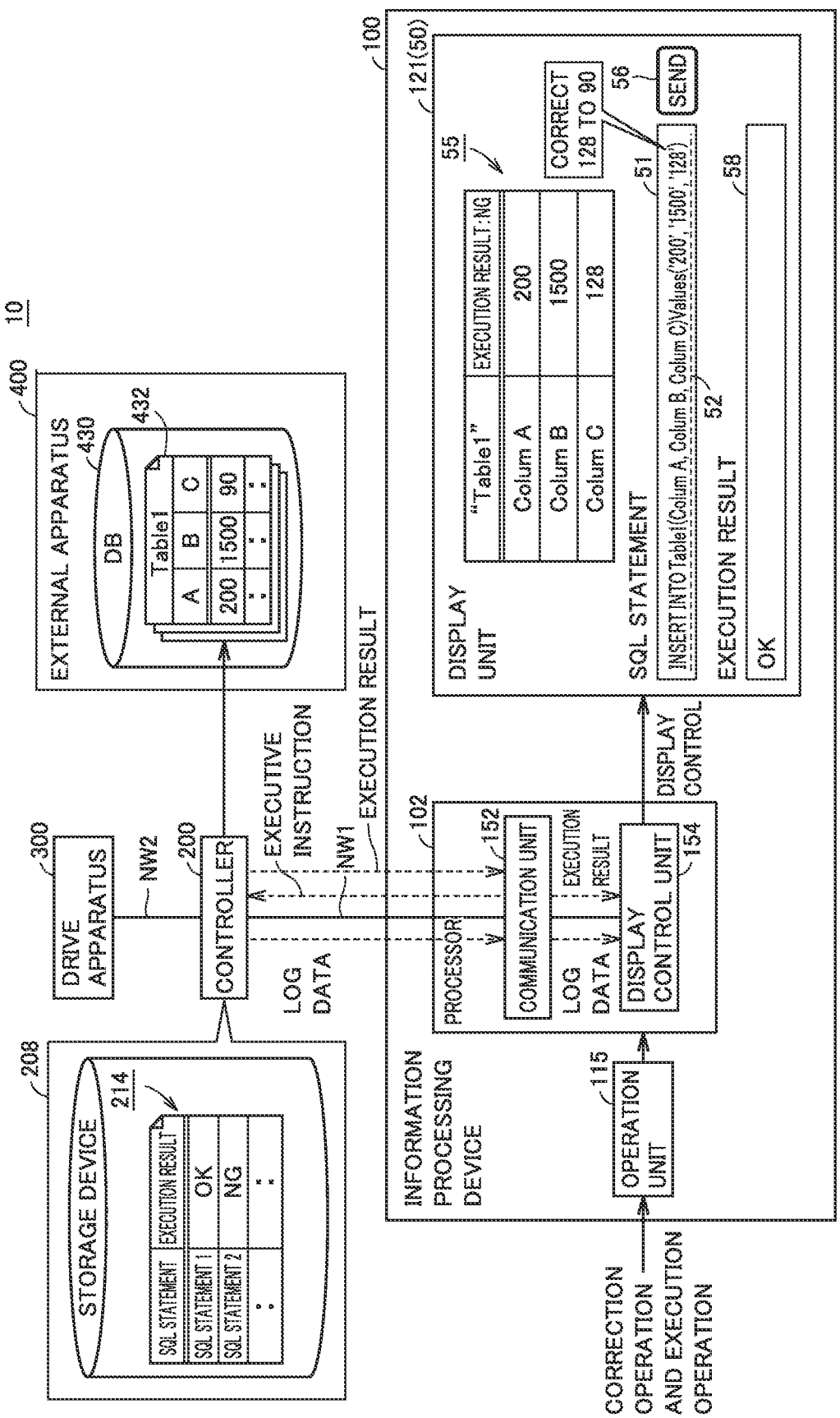
FIG. 1 is a diagram illustrating an example configuration of a control system according to an embodiment.

Hereinafter, embodiments according to the present disclosure will be described with reference to the drawings. In the following description, the same parts or components are denoted by the same reference numerals, and have the same names and functions. Therefore, the detailed description thereof will not be repeated.

A. Application Example

An application example of the present disclosure will be described with reference to FIG. 1. FIG. 1 is a diagram illustrating an example configuration of a control system 10 according to an embodiment.

The control system 10 is an FA (Factory Automation) system for automating a production process. In the example of FIG. 1, the control system 10 includes one or more information processing devices 100, one or more controllers 200, one or more drive apparatuses 300, and one or more external apparatuses 400.

The information processing device 100, the controller 200, and the external apparatus 400 are connected to a network NW1. The network NW1 may be an EtherNET, an OPC-UA (Object Linking and Embedding for Process Control Unified Architecture), or the like. The OPC-UA is a communication standard for realizing data exchange without depending on the type of vendor or OS (Operating System).

The controller 200 and the drive apparatus 300 are connected to a network NW2. The network NW2 is preferably a field network that performs constant-period communication to guarantee the arrival time of data. The field network that performs constant-period communication is known as an EtherCAT (registered trademark), an EtherNet/IP (registered trademark), a CompoNet (registered trademark), or the like.

The information processing device 100 may be, for example, a notebook PC (Personal Computer) or a desktop PC, a tablet terminal, a smartphone, or the other information processing terminal. The hardware configuration of the information processing device 100 includes a processor 102, an operation unit 115, and a display unit 121.

The controller 200 may be, for example, a PLC (Programmable Logic Controller). The controller 200 controls the drive apparatus 300 in accordance with a pre-determined user program. The drive apparatus 300 includes various industrial apparatuses for automating a production process. As an example, the drive apparatus 300 may be a robot controller, a servo driver, an arm robot controlled by the robot controller, a servo motor controlled by the servo driver, or the like. Further, the drive apparatus 300 may be a visual sensor which photographs a workpiece, any other devices used in a production process, or the like.

During the execution of a user program, the controller 200 collects various kinds of data indicating the state of the drive apparatus 300 to be controlled, and periodically adds the collected data to a data base 430 on the external apparatus 400. Alternatively, the collected data may be added to the data base 430 at a predetermined time when a control input is made or when the execution is completed. The data base 430 on the external apparatus 400 is constituted by one or more tables 432 generated in advance. The table 432 includes vertical fields as columns and horizontal fields as records. The collected data is added to the table 432 defined by the SQL statement.

The controller 200 stores the result of adding the collected data to the data base 430 in the storage device 208 as log data 214. In the log data 214, each SQL statement executed so as to add the collected data into the data base 430 is associated with the execution result of each SQL statement. For example, if a SQL statement is successfully executed, a symbol "OK" indicating that the execution result is successful is written to the log data 214 together with the executed SQL statement. On the other hand, if the SQL statement is not successfully executed, a symbol "NG" indicating that the execution result is unsuccessful is written to the log data 214 together with the executed SQL statement. Preferably, an error code is further written to the log data 214. The error code includes, for example, an error code indicating a connection error, an error code indicating that the right side of a character string is discarded, an error code indicating that the data is out of a data range, an error code indicating that the format of date and time is invalid, or the like.

When an error occurs in the log data 214, the user needs to determine the cause of the error so as to correct the SQL statement, the configuration or the like. Errors may be caused by various factors, and depending on the types of errors, it is very difficult to determine the cause of an error. The information processing device 100 assists the user in determining the cause of an error that occurs during the addition of the collected data to the data base 430. As a functional configuration constituting the information processing device, the processor 102 provides a communication unit 152 and a display control unit 154.

The communication unit 152 is implemented by a communication driver that establishes communication with the controller 200. The communication unit 152 receives the log data 214 from the controller 200, and outputs the received log data 214 to the display control unit 154.

The display control unit 154 is a functional module that controls the contents to be displayed on the display unit 121. In the example of FIG. 1, the display control unit 154 displays on the display unit 121 an edit screen 50 for editing an SQL statement.

The edit screen 50 includes an SQL statement edit field 51, a record information display field 55, a send button 56, and a result display field 58.

The display control unit 154 displays in the edit field 51 an SQL statement 52 which is among the SQL statements included in the log data 214 and has an unsuccessful execution result. Further, the display control unit 154 displays in the record information display field 55 the details of data unsuccessfully inserted by the SQL statement 52. The contents displayed in the record information display field 55 include the name of a table for the data insertion, the name of each field in the table, and the value of the unsuccessfully inserted data.

The operation unit 115 accepts various user operations on the information processing device 100. As an example, the operation unit 115 accepts a correction operation to correct the SQL statement 52 displayed in the edit field 51. The operation unit 115 accepts an execution operation to execute the corrected SQL statement 52. The execution operation is accepted, for example, when the send button 56 on the edit screen 50 is pressed.

The communication unit 152 sends the corrected SQL statement 52 and an execution instruction to execute the corrected SQL statement 52 to the controller 200 after the operation unit 115 accepts an execution operation. The controller 200 causes the external apparatus 400 to execute the corrected SQL statement 52 upon receipt of the corrected SQL statement 52 and the execution instruction from the information processing device 100. Thereafter, the controller 200 sends the execution result of the corrected SQL statement 52 to the information processing device 100. The communication unit 152 of the information processing device 100 outputs the execution result to the display control unit 154 upon receipt of the execution result from the controller 200. Then, the display control unit 154 displays on the display unit 121 the execution result received from the communication unit 152. In the example of FIG. 1, the execution result of the corrected SQL statement 52 is displayed in the execution result display field 58 on the edit screen 50.

As described in the above, the information processing device 100 displays on the display unit 121 the SQL statement 52 to be corrected which is among the SQL statements included in the log data 214 and has an unsuccessful execution result. Then, the information processing device 100 accepts a correction operation to correct the displayed SQL statement 52 and an execution operation to execute a test on the corrected SQL statement 52. By providing such a debug environment, the user may easily determine the cause of an error that occurs during the addition of the collected data to a data base, and may correct the SQL statement or the configuration in accordance with the determined cause.

Although in the example of FIG. 1, it is described that the data base 430 is provided on the external apparatus 400, it is not necessary that the data base 430 is provided on the external apparatus 400. For example, the data base 430 may be provided on the controller 200. Alternatively, the data base 430 may be provided on a separate unit connected to the controller 200 via an internal bus.

The writing function to the data base and the log storing function may be implemented on an unit attached to the controller 200. The log data 214 may be stored in the information processing device 100 instead of the controller 200.

B. Hardware Configuration

Figure 2:
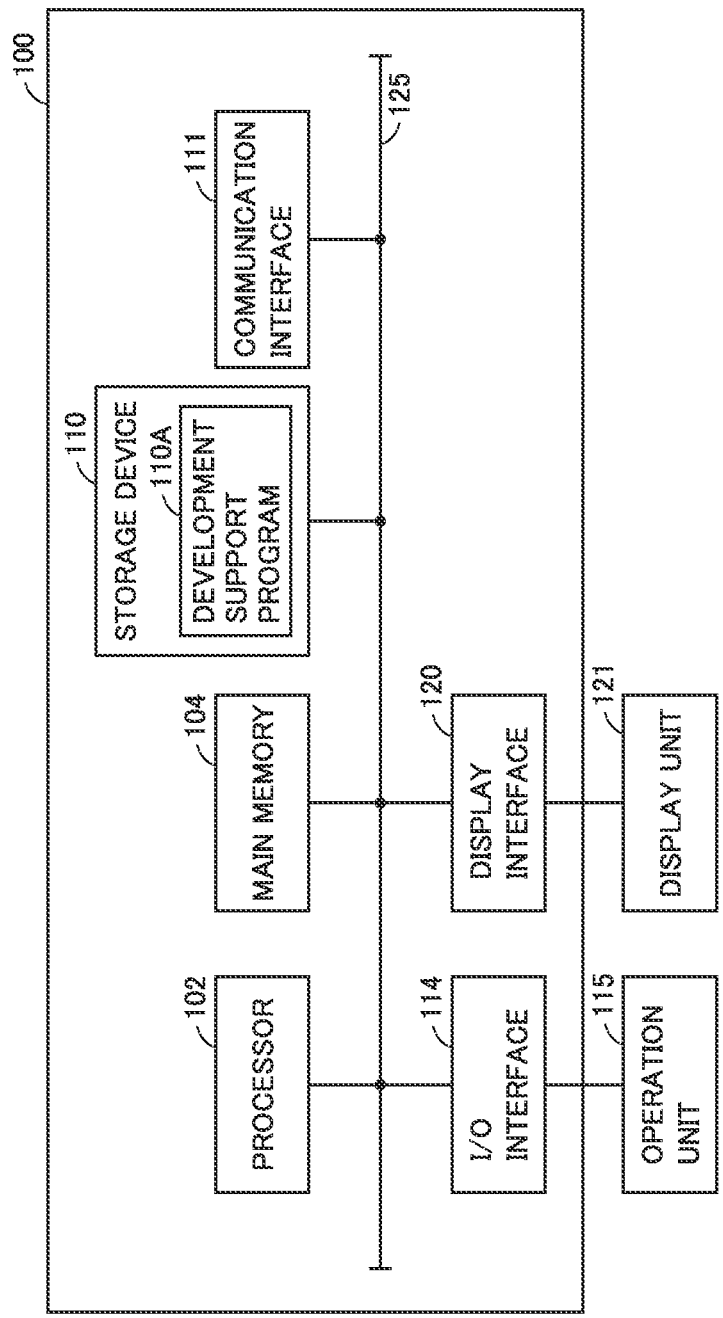
FIG. 2 is a schematic diagram illustrating a hardware configuration of an information processing device according to an embodiment.
Figure 3:
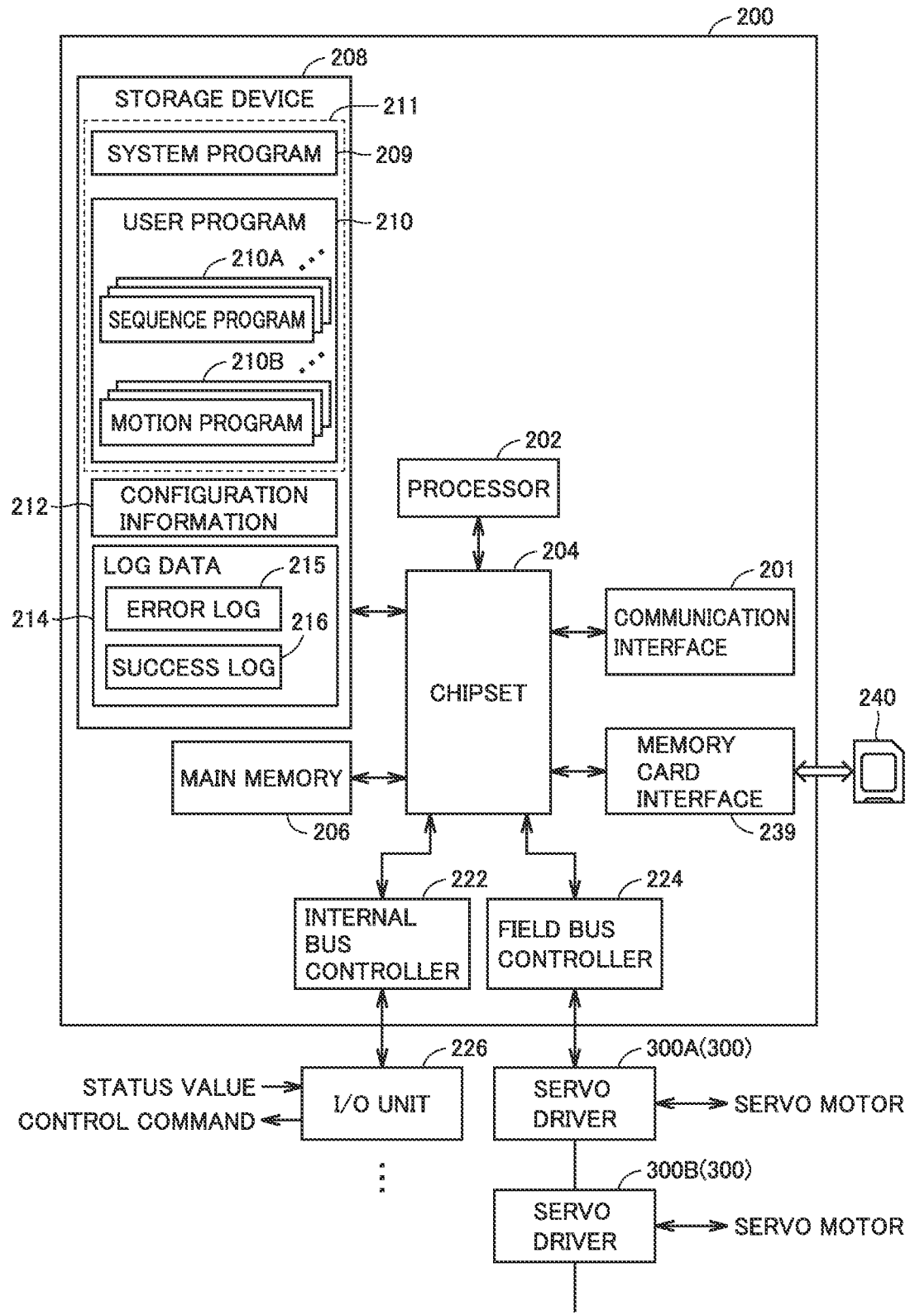
FIG. 3 is a schematic diagram illustrating a hardware configuration of a controller according to an embodiment.
Figure 4:
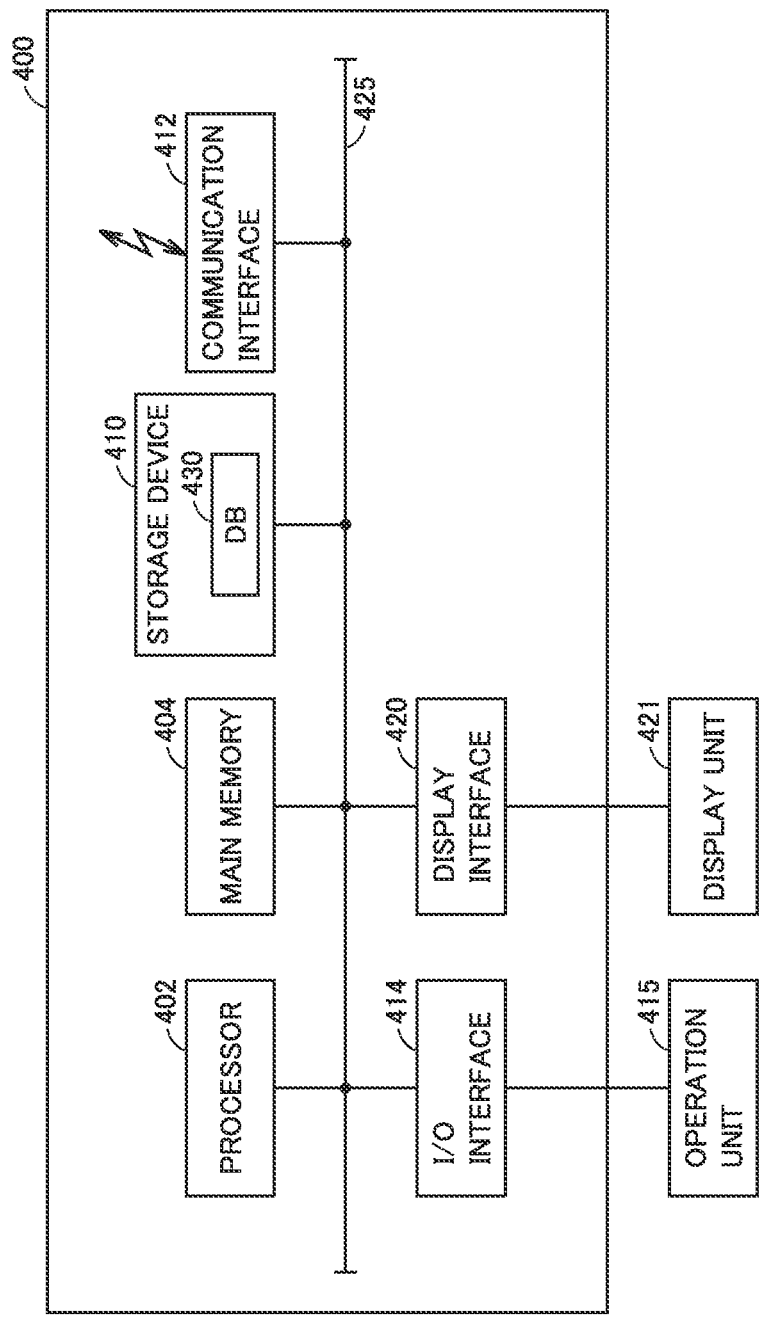
FIG. 4 is a block diagram illustrating a hardware configuration of an external apparatus according to the embodiment.

The hardware configuration of the information processing device 100, the hardware configuration of the controller 200, and the hardware configuration of the external apparatus 400 will be described in order with reference to FIGS. 2 to 4.

(B1. Hardware Configuration of Information Processing Device 100)

First, the hardware configuration of the information processing device 100 will be described with reference to FIG. 2. FIG. 2 is a schematic diagram illustrating a hardware configuration of the information processing device 100.

The information processing device 100 is, for example, a computer constructed according to a general-purpose computer architecture. The information processing device 100 includes a processor 102 such as a CPU (Central Processing Unit) or an MPU (Micro-Processing Unit), a main memory 104, a nonvolatile storage device 110, a communication interface 111, an I/O (Input/Output) interface 114, and a display interface 120. These components are communicatively connected to each other via an internal bus 125.

The processor 102 controls the operation of the information processing device 100 by executing various control programs such as a development support program 110A. The development support program 110A is such a program that provides an environment for developing a control program (user program) of the controller 200. Upon receipt of an execution instruction to execute various control programs such as the development support program 110A, the processor 102 reads out a target control program from the storage device 110 into the main memory 104.

The communication interface 111 exchanges data with the other communication devices via network. The other communication devices include, for example, a controller 200, an external apparatus 400, and a server. The information processing device 100 may be configured to download various control programs such as the development support program 110A from the other communication device via the communication interface 111.

The I/O interface 114 is connected to the operation unit 115, and is configured to receive from the operation unit 115 a signal indicating a user operation. The operation unit 115 typically includes a keyboard, a mouse, a touch panel, a touch pad or the like, and accepts operations from a user. In the example of FIG. 2, the information processing device 100 and the operation unit 115 are illustrated as separate units, but the information processing device 100 and the operation unit 115 may be constructed as an integral unit.

The display interface 120 is connected to the display unit 121, and is configured to send to the display unit 121 an image signal for displaying an image in accordance with an instruction from the processor 102 or the like. The display unit 121 may be, for example, an LCD (Liquid Crystal Display) or an organic EL (Electro Luminescence) display, and is configured to present various kinds of information to the user. The display unit 121 may display various screens provided by the development support program 110A. In the example of FIG. 2, the information processing device 100 and the display unit 121 are illustrated as separate units, but the information processor 100 and the display unit 121 may be constructed as an integral unit.

(B2. Hardware Configuration of Controller 200)

Next, the hardware configuration of the controller 200 will be described with reference to FIG. 3. FIG. 3 is a schematic diagram illustrating a hardware configuration of the controller 200.

The controller 200 includes a communication interface 201, a processor 202 such as a CPU or MPU, a chipset 204, a main memory 206, a nonvolatile storage device 208, an internal bus controller 222, a field bus controller 224, and a memory card interface 239.

The processor 202 controls various drive apparatuses 300 by reading out the control program 211 stored in the storage device 208, developing the control program 211 in the main memory 206, and executing the control program 211. The control program 211 includes various programs for controlling the controller 200. As an example, the control program 211 includes a system program 209, a user program 210 or the like. The system program 209 includes instruction codes for providing basic functions of the controller 200 such as data input/output processing or execution timing control. The user program 210 is downloaded from the information processing device 100. The user program 210 may be configured arbitrarily according to a control target, and includes a sequence program 210A for executing a sequence control and a motion program 210B for executing a motion control.

The chipset 204 controls each component so as to realize the overall processing of the controller 200.

The storage device 208 stores the control program 211 and various data. As an example, the storage device 208 stores configuration information 212 which defines a correspondence relationship between a data type on the user program 210 and a data type on the data base 430, and the log data 214 (see FIG. 1). The detail of the configuration information 212 will be described later. The log data 214 includes an error log 215 and a success log 216.

The internal bus controller 222 is an interface that exchanges data with various devices connected to the controller 200 via an internal bus. As an example of such a device, an I/O unit 226 connected to the controller 200 may be given.

The field bus controller 224 is an interface that exchanges data with various drive apparatuses 300 connected to the controller 200 via a field bus. As an example of such a device, a servo driver 300A and a servo driver 300B connected to the controller 200 may be given. In addition, a drive apparatus such as a robot controller or a visual sensor may be connected to the controller 200.

The internal bus controller 222 and the field bus controller 224 may provide arbitrary instructions to any device connected thereto, and may acquire arbitrary data managed by any device connected thereto. The internal bus controller 222 and/or the field bus controller 224 also functions as an interface for exchanging data with a robot controller or a servo driver.

The communication interface 201 controls the data exchange via various wired/wireless networks. The controller 200 communicates with the information processing device 100 and the external apparatus 400 via the communication interface 201. In addition, the controller 200 may access the data base 430 on the external apparatus 400 via the communication interface 201.

The memory card interface 239 is such an interface that permits an external storage medium such as a memory card 240 (for example, an SD card) to be attached thereto or detached therefrom, and permits data to be written to the memory card 240 and data to be read out from the memory card 240.

(B3. Hardware Configuration of External Apparatus 400)

Next, the hardware configuration of the external apparatus 400 will be described with reference to FIG. 4. FIG. 4 is a block diagram illustrating a hardware configuration of the external apparatus 400.

The external apparatus 400 is constructed according to a general-purpose hardware architecture. In other words, the external apparatus 400 is constructed as a personal computer. However, the external apparatus 400 may be constructed as dedicated hardware instead of general-purpose hardware.

More specifically, the external apparatus 400 includes a processor 402 such as a CPU or MPU, a main memory 404, a nonvolatile storage device 410, a communication interface 412, an I/O interface 414, and a display interface 420. These components are communicatively connected to each other via an internal bus 425.

The processor 402 controls the external apparatus 400 by reading out a control program (not shown) stored in the storage device 410, developing the control program in the main memory 404, and executing the control program. In other words, the processor 402 implements a control unit that performs control operation in cooperation with the main memory 404 and the storage device 410.

The communication interface 412, the I/O interface 414, and the field bus interface 416 mediate the exchange of data between the external apparatus 400 and the other communication devices.

More specifically, the communication interface 412 mediates communications with the controller 200 via the network NW1 (see FIG. 1) or the like. The communication interface 412 may be, for example, a component capable of communicating in accordance with EtherNET.

The I/O interface 414 is connected to the operation unit 415, and is configured to receive from the operation unit 415 a signal indicating a user operation. The operation unit 415 typically includes a keyboard, a mouse, a touch panel, a touch pad or the like, and accepts an operation from a user. In the example of FIG. 4, the external apparatus 400 and the operation unit 415 are illustrated as separate units, but the external apparatus 400 and the operation unit 415 may be constructed as an integral unit.

The display interface 420 is connected to the display unit 421, and is configured to send to the display unit 421 an image signal for displaying an image in accordance with an instruction from the processor 402 or the like. The display unit 421 may be an LCD, an organic EL display, or the like, and is configured to present various kinds of information to the user. In the example of FIG. 4, the external apparatus 400 and the display unit 421 are illustrated as separate units, but the external apparatus 400 and the display unit 421 may be constructed as an integral unit.

C. Sequence Flow During Normal Operation

Figure 5:
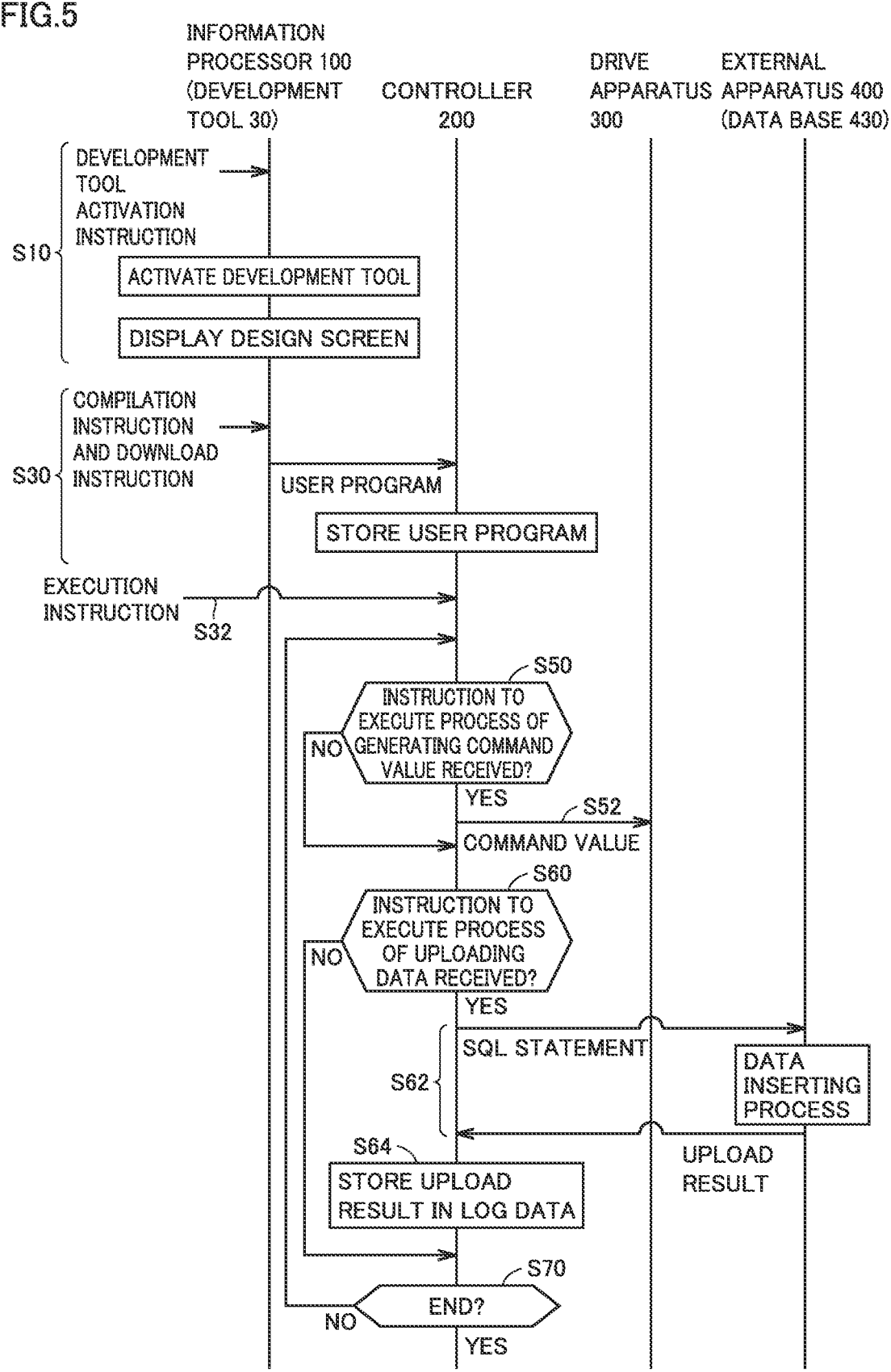
FIG. 5 is a diagram illustrating a sequence flow between an information processing device, a controller, a drive apparatus, and an external apparatus during normal operation.

A sequence flow during normal operation will be described with reference to FIGS. 5 and 6. FIG. 5 is a diagram illustrating a sequence flow between the information processing device 100, the controller 200, the drive apparatus 300, and the external apparatus 400 during normal operation.

In step S10, the information processing device 100 receives an activation instruction to activate the development support program 110A (see FIG. 5). Upon receipt of the activation instruction, the information processing device 100 activates a development tool 30 as illustrated in FIG. 6. FIG. 6 is a diagram illustrating a program design screen 31 provided by the development tool 30. The program design screen 31 is displayed, for example, on the display unit 121 of the information processing device 100.

The user program 210 may be described in any programming language. For example, the user program 210 may be described in a ladder diagram (LD), or may be described in an instruction list (IL), a structured text (ST), or a sequential function chart (SFC), or a combination thereof. Alternatively, the user program 210 may be described in a general-purpose programming language such as JavaScript (registered trademark) or C language.

Figure 6:
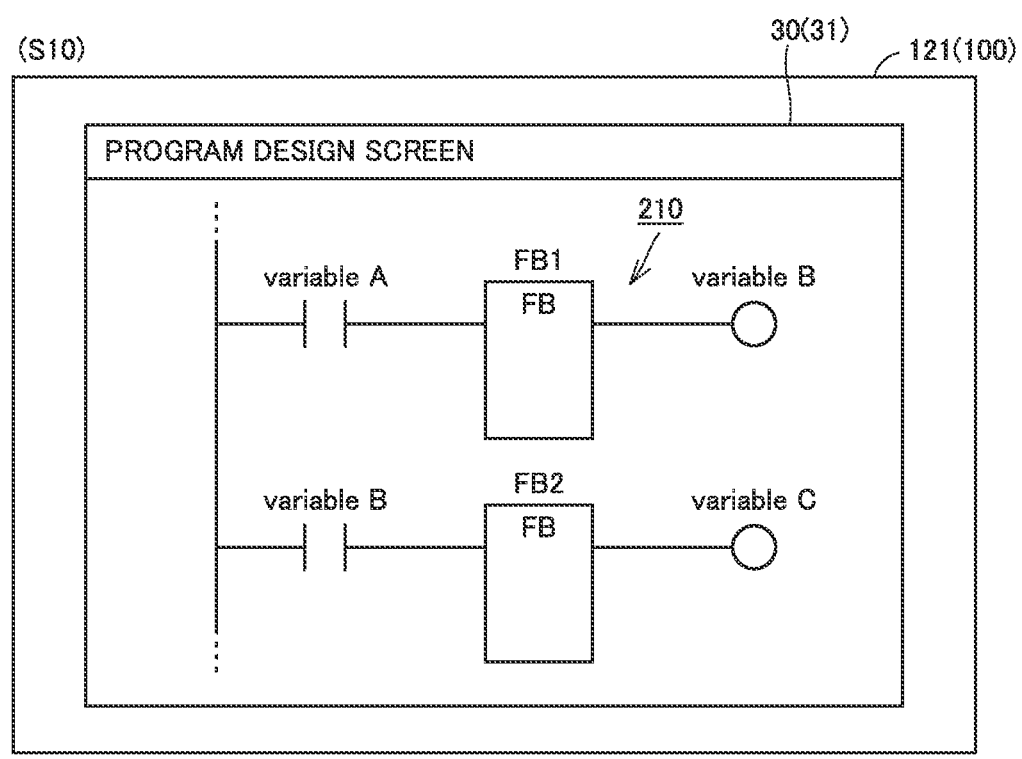
FIG. 6 is a diagram illustrating a program design screen provided by a development tool.

In the example of FIG. 6, the user program 210 is described in a ladder diagram. On the program design screen 31, a designer may design the user program 210 suitable for controlling a target drive apparatus 300 by combining any function blocks or specifying input/output relationships of variables and function blocks. Each function block is a component integrated with functions repeatedly used in the user program 210.

In the example of FIG. 6, the user program 210 includes variables A to C and function blocks FB1 and FB2. The function block FB1 executes a predetermined function defined in the function block FB1 based on the value of the variable A associated with an input of the function block FB1. The execution result is reflected in the variable B associated with an output of the function block FB1. The function block FB2 executes a predetermined function defined in the function block FB2 based on the value of the variable B associated with an input of the function block FB2. The execution result is reflected in the variable C associated with an output of the function block FB2. Thus, the designer may design an arbitrary user program 210 by combining the variables and the function blocks on the program design screen 31.

In addition, the user program 210 may include a function block for adding data to the data base 430. The function block, after receiving the collected data input from the controller 200, generates an SQL statement for adding the collected data to the data base 430, and causes the external apparatus 400 to execute the generated SQL statement.

With reference to FIG. 5 again, in step S30, the development tool 30 receives a compilation instruction. Upon receipt of the compilation instruction, the development tool 30 compiles the user program 210 designed on the program design screen 31. Thereafter, the development tool 30 receives a download instruction to download the compilation result. Upon receipt of the download instruction, the development tool 30 transfers the compiled user program 210 to the controller 200. The controller 200 stores the received user program 210 in the storage device 208 (see FIG. 3).

In step S32, the controller 200 receives an execution instruction to execute the user program 210. Upon receipt of the execution instruction, the controller 200 starts executing the user program 210. When the user program 210 is a cyclic executable program, the controller 200 repeatedly executes a group of instructions included in the user program 210 at predetermined control cycles. More specifically, the controller 200 executes the first line to the last line of the user program 210 in one control cycle. In the next control cycle, the controller 200 executes the first line to the last line of the user program 210 again. The controller 200 generates a command value in each control cycle, and outputs the command value to the drive apparatus 300.

In step S50, the controller 200 determines whether or not an execution instruction to execute a process of generating a command value specified in the user program 210 is received. As an example, the execution instruction is issued in response to an input signal from an input device (such as a sensor or the like). If the controller 200 determines that the execution instruction is received (YES in step S50), the controller 200 generates the command value in accordance with the execution instruction, and sends the command value to the drive apparatus 300 (step S52). The drive apparatus 300 transports the control target in accordance with the command value received from the controller 200. If the controller 200 determines that an execution instruction to execute the process of generating a command value is not received (NO in step S50), the controller 200 proceeds the procedure to step S60 without executing step S52.

In step S60, the controller 200 determines whether or not an execution instruction to execute a process of uploading the collected data is received. If the controller 200 determines that the execution instruction is received (YES in step S60), the controller 200 generates an SQL statement for executing an insertion instruction. The SQL statement defines information (for example, a table name) which defines a destination table to which the data is inserted, the value of the data to be uploaded to each field or the like. If the controller 200 determines that the execution instruction is not received (NO in step S60), the controller 200 proceeds the procedure to step S70 without executing step S62.

At the time of generating the SQL statement, the controller 200 converts the type of each data to be collected, which is defined by the user program 210, into a data type of the data base 430. The type conversion is performed, for example, based on the configuration information 212 illustrated in FIG. 7. FIG. 7 is a diagram illustrating an example configuration information 212. The configuration information 212 is predefined by the user, for example. As illustrated in FIG. 7, in the configuration information 212, a correspondence relationship between the data type of the user program 210 and the data type of the data base 430 is defined for each table included in the data base 430.

In step S62, the controller 200 sends the SQL statement generated on the basis of the configuration information 212 to the external apparatus 400. The external apparatus 400 generates a record reflecting the variable value in each field in accordance with the SQL statement received from the controller 200, and adds the generated record to the corresponding table 432 in the data base 430. Thus, the collected data is reflected in the data base 430. Thereafter, the external apparatus 400 sends to the controller 200 an upload result indicating whether the execution of the SQL statement is successful or unsuccessful.

In step S64, the controller 200 associates the upload result received from the external apparatus 400 with the executed SQL statement, and writes both to the log data 214. If the upload result indicates that the upload is unsuccessful, the upload result is written to the log data 214 as an error log 215. On the other hand, if the upload result indicates that the upload is successful, the upload result is written to the log data 214 as a success log 216.

In step S70, the controller 200 determines whether or not to end the user program 210. An end instruction is issued, for example, upon receipt of an end operation from the user. If the controller 200 determines that an end operation is received from the user (YES in step S70), the controller 200 ends the user program 210. Otherwise (NO in step S70), the controller 200 returns the procedure to step S50.

In the above, it is described that an SQL statement of an insertion instruction is sent from the controller 200 to the data base 430 on the external apparatus 400 in step S62, and however, it is acceptable that only a value to be inserted is sent the data base 430 on the external apparatus 400 in step S62. In this case, the external apparatus 400 generates an SQL statement of an insertion instruction upon receipt of the value to be inserted, and executes a process to insert the received value in accordance with the SQL statement.

D. Sequence Flow During Debug Operation

Figure 8:
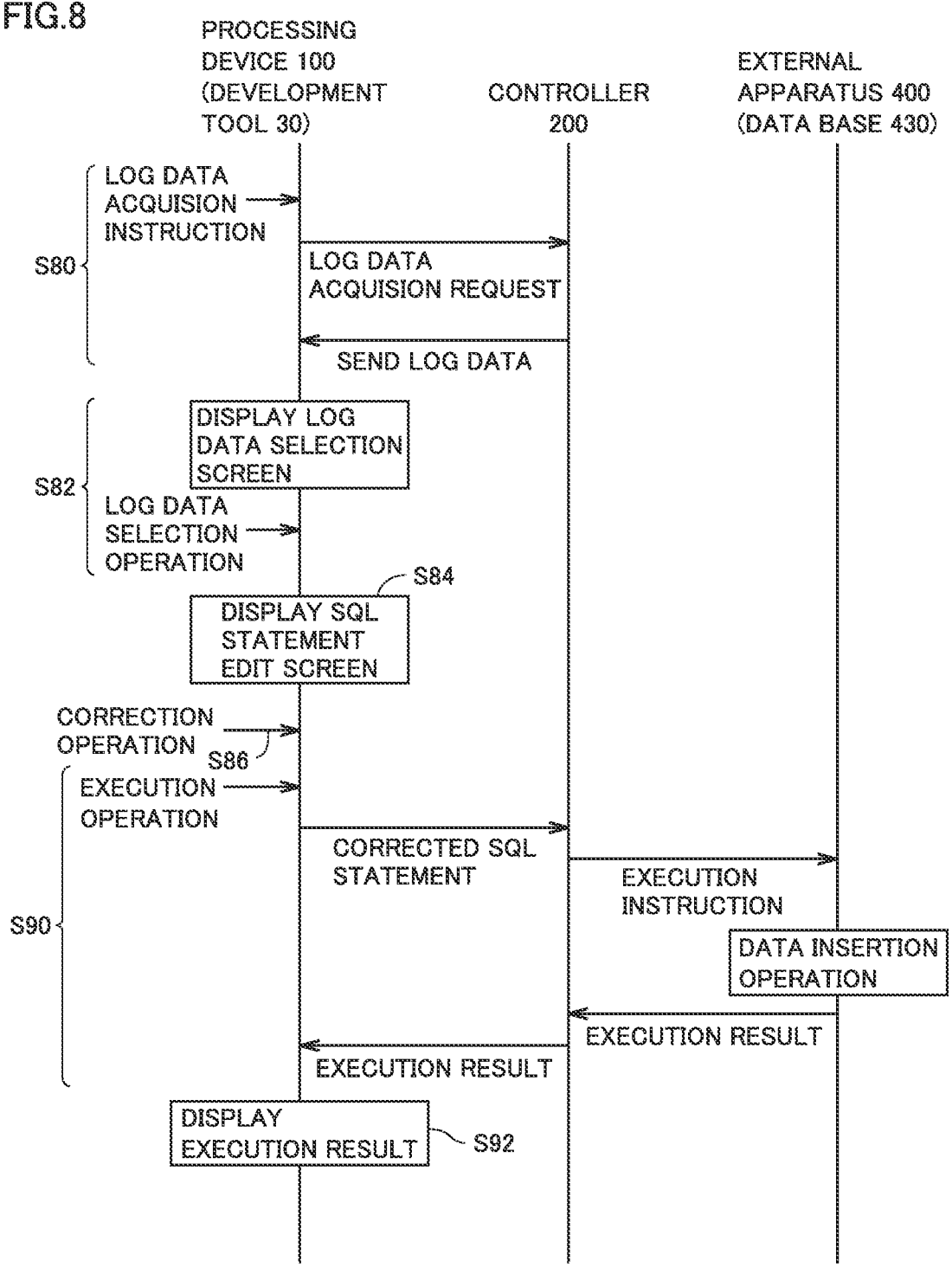
FIG. 8 is a diagram illustrating a sequence flow between an information processing device, a controller, a drive apparatus, and an external apparatus during debug operation.

A sequence flow during debug operation will be described with reference to FIGS. 8 to 11. FIG. 8 is a diagram illustrating a sequence flow between the information processing device 100, the controller 200, the drive apparatus 300, and the external apparatus 400 during debug operation.

In step S80, the information processing device 100 receives an acquisition instruction to acquire the log data 214 (see FIG. 1). The acquisition instruction is received by the development tool 30, for example. The information processing device 100 sends an acquisition request to acquire the log data 214 to the controller 200 upon receipt of the acquisition instruction to acquire the log data 214. Upon receipt of the acquisition request, the controller 200 sends the log data 214 stored in the storage device 208 (see FIG. 3) to the information processing device 100.

In step S82, the information processing device 100, upon receipt of the log data 214 from the controller 200, displays on the display unit 121 of the information processing device 100 a selection screen 40 illustrated in FIG. 9. FIG. 9 is a diagram illustrating a selection screen 40 for selecting an error log.

As illustrated in FIG. 9, when a tab TB1 on the selection screen 40 is pressed, the information processing device 100 displays the error logs included in the log data 214 as a log list 41. In the log list 41, an entry, date and time where an error occurs, an error category, a log code, a log name, an execution result of SQL statement, an error code, a connection name to a data base, and a serial ID are displayed side by side. The user may select one of the error logs displayed in the log list 41. The error log may be selected by using, for example, the operation unit 115 of the information processing device 100.

In response to the selection of one error log from the log list 41, the SQL statement 52 corresponding to the selected error log is displayed in the detail display field 45. When the enter button 46 is pressed after the selection of the error log, the selection of the error log is accepted. On the other hand, when the cancel button 47 is pressed, the selection of the error log is canceled, and the selection screen 40 is closed.

In step S82, after the error log is selected, the enter button 46 is pressed. Accordingly, in step S84, the information processing device 100 displays on the display unit 121 an edit screen for editing the SQL statement.

Figure 10:
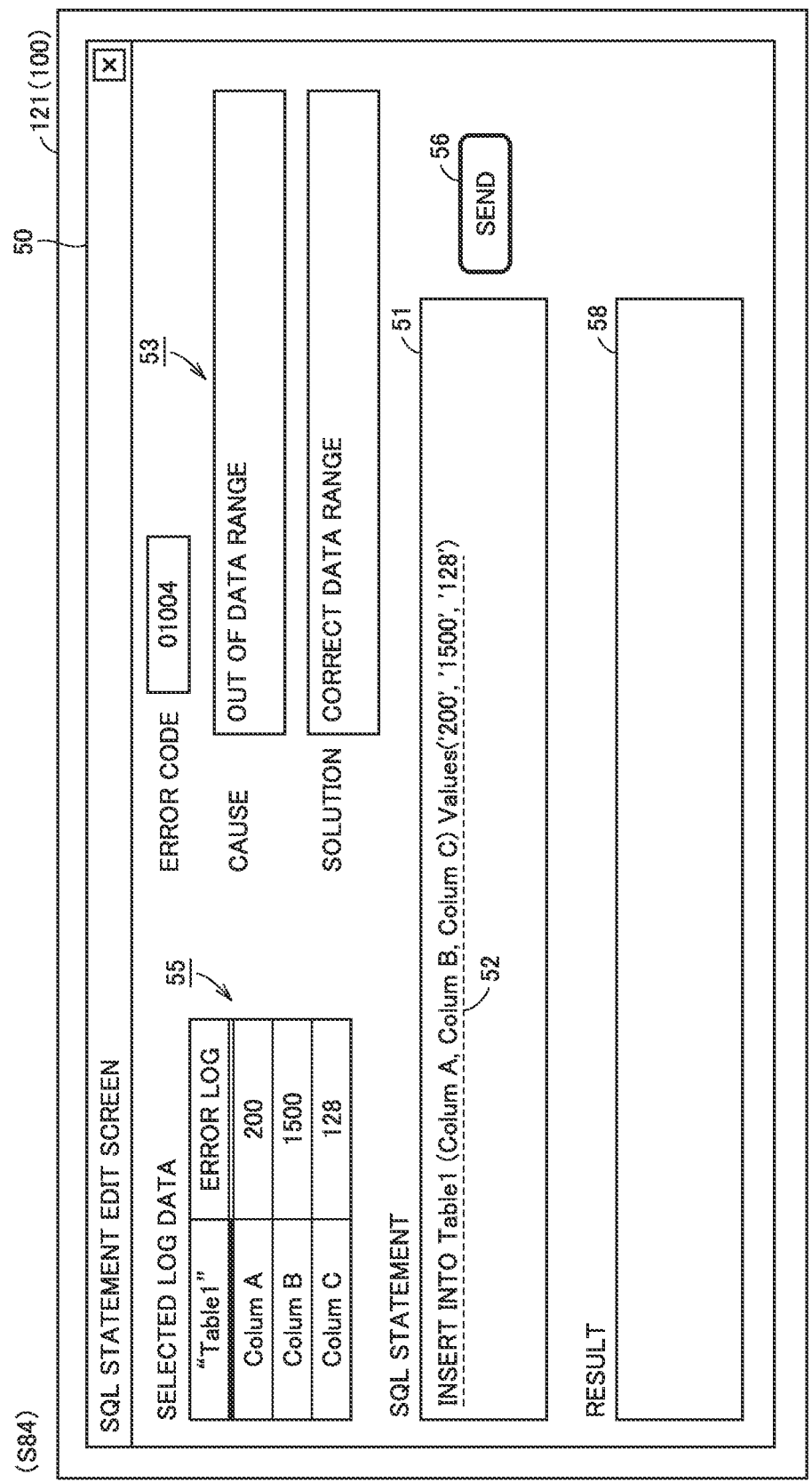
FIG. 10 is a diagram illustrating an edit screen in step S84 illustrated in FIG. 8.

FIG. 10 is a diagram illustrating an edit screen 50 in step S84. The edit screen 50 includes an SQL statement edit field 51, an error detail display field 53, a record information display field 55, a send button 56, and a result display field 58.

In the edit field 51, an SQL statement 52 corresponding to the error log selected in step S82 is displayed.

The detailed information of the selected error log is displayed in the error detail display field 53. The detailed information displayed in the error detail display field 53 includes an error code, the cause of an error, and a solution to the error. The cause of an error and the solution to the error are stored in advance for each error code in the storage device 110 or the like of the information processing device 100. The information processing device 100 displays the cause of an error and the solution to the error corresponding to each error code of the selected error log in the error detail display field 53.

In the record information display field 55, the details of the data which is unsuccessfully inserted by the SQL statement 52 are displayed. The contents displayed in the record information display field 55 include the name of a destination table to which the data is inserted, the name of each field in the table, and the value of the unsuccessfully inserted data.

The operation unit 115 of the information processing device 100 accepts an edit operation to edit the SQL statement 52 displayed in the edit field 51. According to the edit operation, the table name is corrected, or the field name is edited, or the value is edited. Preferably, these edit operations may also be performed on the record information display field 55. Thus, the edit operation performed on one of the edit field 51 and the record information display field 55 is reflected on the other, whereby the display contents of the edit field 51 and the display contents of the record information display field 55 are synchronized with each other.

Figure 11:
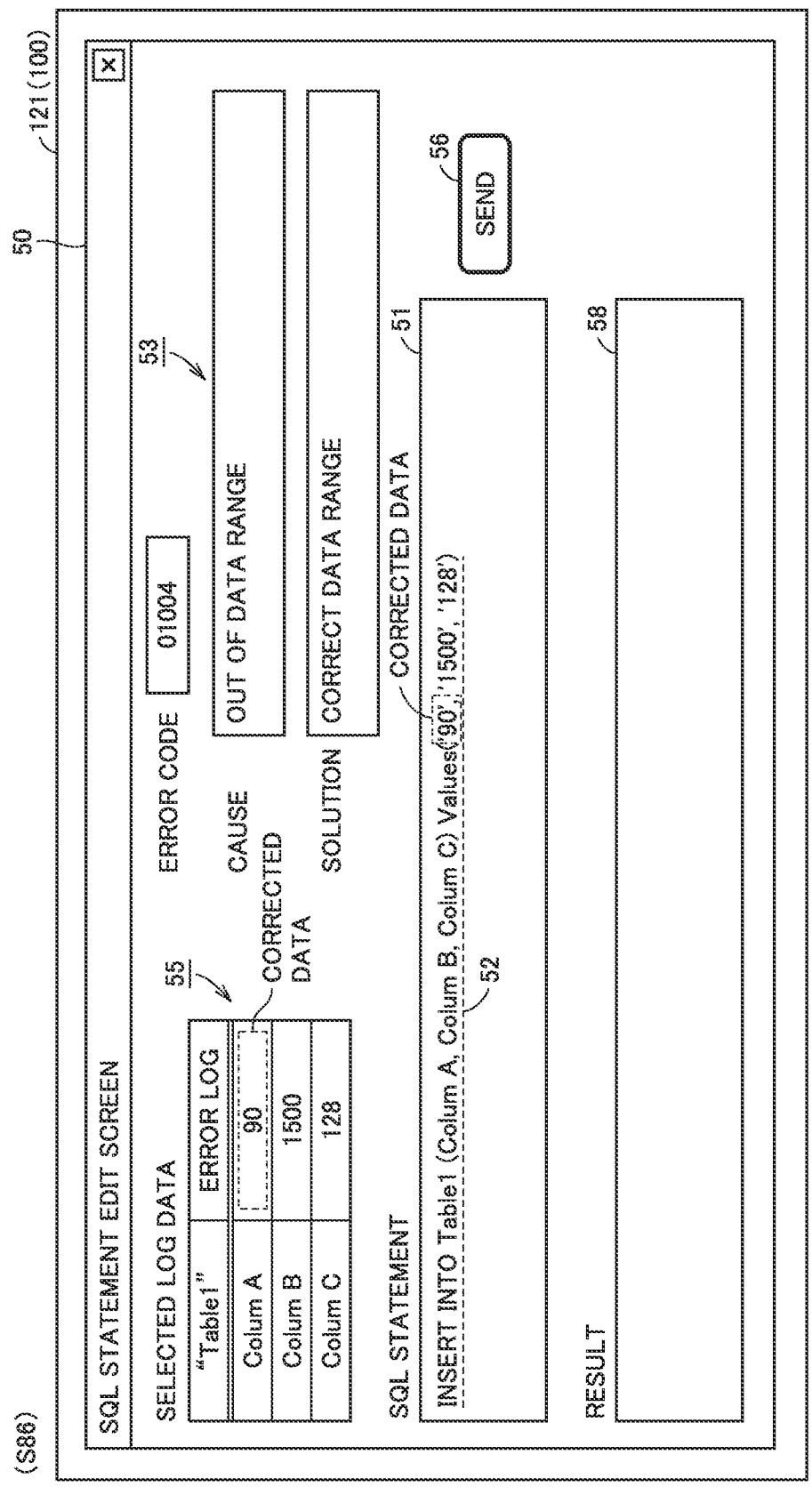
FIG. 11 is a diagram illustrating an edit screen in step S86 illustrated in FIG. 8.

FIG. 11 is a diagram illustrating the edit screen 50 in step S86. As illustrated in FIG. 11, in step S86, the value of column A of the SQL statement 52 is corrected from "200" to "90".

If the send button 56 of the edit screen 50 is pressed in step S90, the execution operation of the edited SQL statement 52 is accepted. The execution operation is accepted by the operation unit 115, for example. Upon receipt of the execution operation by the operation unit 115, the information processing device 100 sends the corrected SQL statement 52 and an execution instruction to execute the corrected SQL statement 52 to the controller 200. Upon receipt of the corrected SQL statement 52 and the execution instruction from the information processing device 100, the controller 200 causes the external apparatus 400 to execute the corrected SQL statement 52.

The external apparatus 400, upon receipt of the execution instruction to execute the corrected SQL statement 52 from the controller 200, executes the corrected SQL statement 52, and inserts data into the data base 430. Thereafter, the external apparatus 400 sends the execution result of the corrected SQL statement 52 to the controller 200. The controller 200 sends the execution result received from the external apparatus 400 to the information processing device 100.

Figure 12:
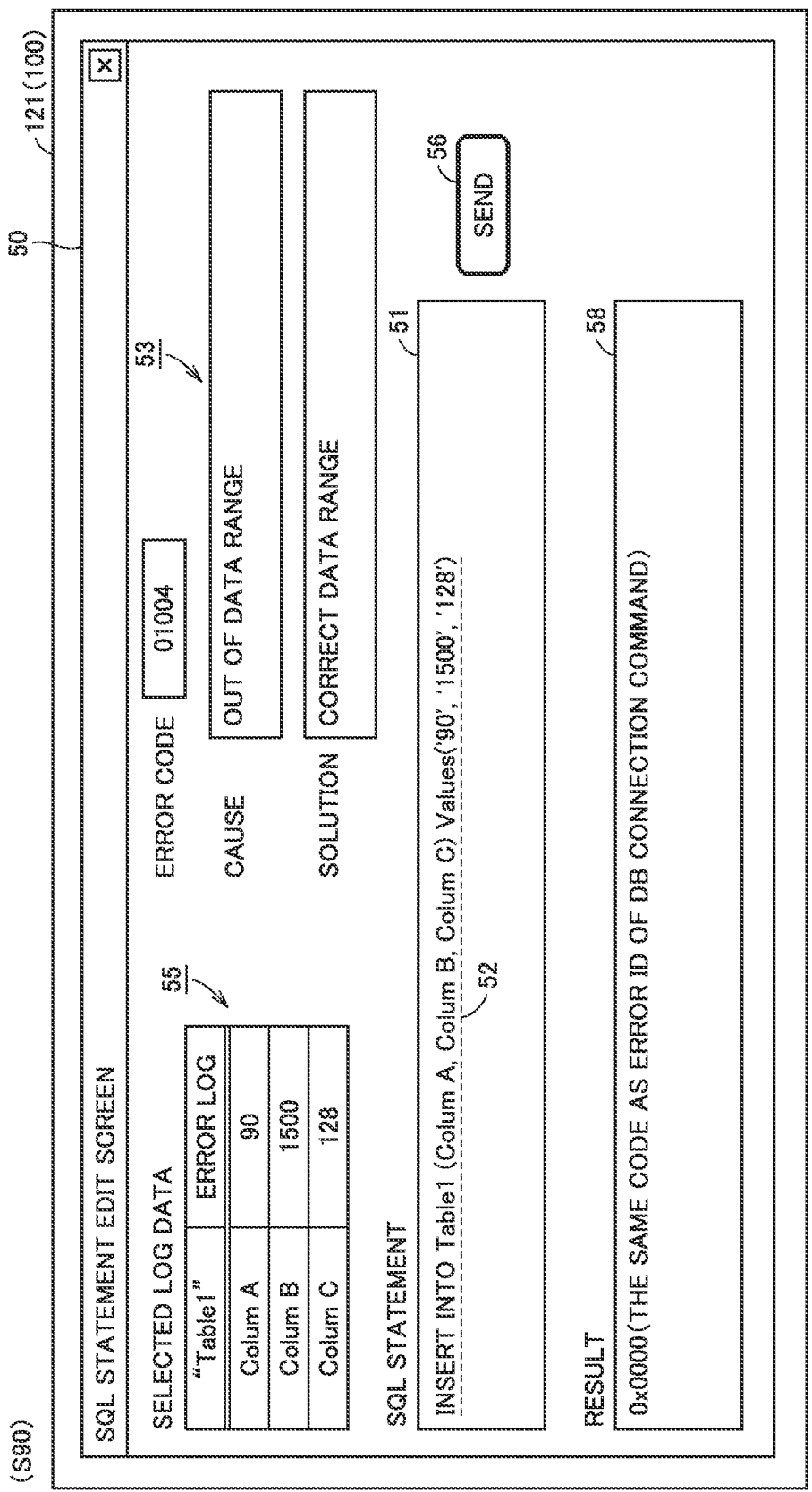
FIG. 12 is a diagram illustrating an edit screen in step S90 illustrated in FIG. 8.

In step S92, the information processing device 100 displays on the edit screen 50 the execution result received from the controller 200. FIG. 12 is a diagram illustrating the edit screen 50 in step S90. As illustrated in FIG. 12, the execution result received from the controller 200 is displayed in the result display field 58 of the edit screen 50. "0×0000" illustrated in FIG. 12 indicates that the execution result is successful.

E. Success Log Selection Screen

In FIG. 9, it is described that an error log is selected from the selection screen 40, and however, a success log may be selected from the selection screen 40. Hereinafter, the selection of a success log will be described with reference to FIGS. 13 and 14.

FIG. 13 is a diagram illustrating a success log selection screen 40. As illustrated in FIG. 13, when a tab TB2 on the selection screen 40 is pressed, the information processing device 100 displays success logs included in the log data 214 as the log list 41. The user may select one of the success logs displayed in the log list 41. The success log may be selected by using, for example, the operation unit 115 of the information processing device 100.

In response to the selection of one success log from the log list 41, an SQL statement 52A corresponding to the selected success log is displayed in the detail display field 45. When the enter button 46 is pressed after the selection of the success log, the selection of the success log is accepted. On the other hand, when the cancel button 47 is pressed, the selection of the success log is canceled, and the selection screen 40 is closed.

Figure 14:
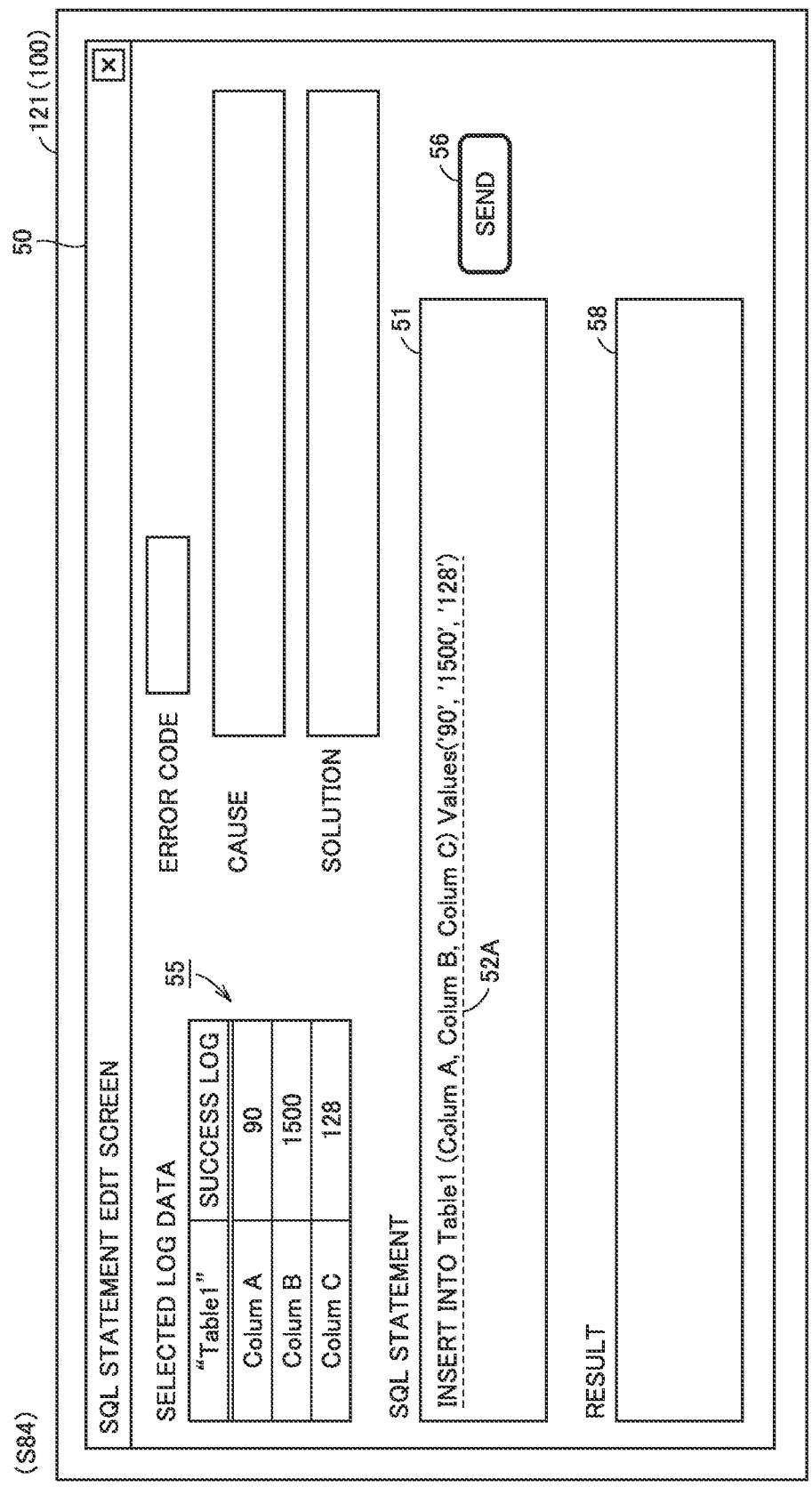
FIG. 14 is a diagram illustrating an edit screen for a selected SQL statement.

FIG. 14 is a diagram illustrating an edit screen 50 for editing the selected SQL statement 52A. The SQL statement 52A corresponding to the selected success log is displayed in the edit field 51. The details of the data successfully inserted by the SQL statement 52A are displayed in the record information display field 55. The contents displayed in the record information display field 55 include the name of a destination table to which the data is inserted, the name of each field in the table, and the value of the successfully inserted data. In this way, the content of the selected success log is displayed, whereby the user may use the successfully executed SQL statement as a reference.

F. Variation of Edit Screen

A variation of the edit screen 50 illustrated in FIG. 10 will be described with reference to FIG. 15. FIG. 15 is a diagram illustrating an edit screen 50A according to a modification.

As described above in FIG. 10, the selected error log is displayed on the edit screen 50. According to the present modification, the selected success log and the selected error log are displayed side by side on the edit screen 50A. By comparing the error log with the success log, the user may easily determine the cause of an error.

As illustrated in FIG. 15, the edit screen 50A according to the present modification includes an SQL statement edit field 51, a record information display field 55A, a send button 56, and a result display field 58.

The edit screen 50A according to the present modification is different from the edit screen 50 in that the record information display field 55A is different from the record information display field 55. The others are the same as those described with reference to FIG. 10, and the description thereof will not be repeated.

As described above, the user may select, from the SQL statements included in the log data 214, not only an SQL statement which has an unsuccessful execution result but also an SQL statement which has a successful execution result. An error log and a success log may be selected by using the operation unit 115, for example. In response to the selection of an error log and a success log, the information processing device 100 displays a data group 57A inserted by an SQL statement to be corrected which has an unsuccessful execution result and a data group 57B inserted by an SQL statement to be compared which has a successful execution result side by side. Thus, the user may compare the data group 57A which has an unsuccessful execution result with the data group 57B which has a successful execution result, and may easily determine the data with an abnormal value. As a result, the user may modify the data insertion location in the user program 210, the configuration information 212 (see FIG. 7) or the like.

Preferably, the information processing device 100 displays a set of data satisfying a predetermined comparison condition among the entire data set composed of the data included in the data group 57A which has an unsuccessful execution result and the data included in the data group 57B which has a successful execution result in a display mode different from the other data in the data set. In the example of FIG. 15, the pair of data in column A is highlighted as compared with the pair of data in column B and the pair of data in column C. The highlighting may be realized by, for example, hatching, displaying in a specific color (for example, red), or blinking. Thereby, it is possible to easily recognize the data whose value is abnormal.

The comparison condition is satisfied when the pair of data composed of one data included in the data group 57A and the other data included in the data group 57B matches a predetermined rule. In one aspect, the comparison condition is satisfied when one data is greater than or equal to a predetermined value (such as 100) and the other data is less than the predetermined value (such as 100). In another aspect, the comparison condition is satisfied when the number of digits is different between two data in the pair of data. The comparison condition may be set by the user in advance or may be set at the time of design.

G. Variation of Selection Screen

A variation of the selection screen 40 illustrated in FIG. 13 will be described with reference to FIG. 16. FIG. 16 is a diagram illustrating a selection screen 40A according to a modification.

As described above in FIG. 13, all the success logs included in the log data 214 are displayed on the selection screen 40; and as described above in FIG. 15, the SQL statement corresponding to one success log selected from the success logs is displayed as a comparison for an SQL statement to be corrected. According to the present modification, the selection screen 40A has a function of filtering the success logs to be displayed, and may extract a success log highly related to the SQL statement to be corrected. Thus, the user may easily select a success log for comparison.

As illustrated in FIG. 16, the selection screen 40A according to the present modification includes a log list 41, a filtering condition input field 44, a detail display field 45, an enter button 46, and a cancel button 47.

The selection screen 40A illustrated in FIG. 16 is different from the selection screen 40 illustrated in FIG. 13 in that the selection screen 40A further includes a filtering condition input field 44. The others are the same as those described with reference to FIG. 13, and the description thereof will not be repeated.

The information processing device 100 displays on the display unit 121 an SQL statement, which is among the successful SQL statements included in the log data 214 and matches a part of the SQL statement to be corrected as a candidate for the SQL statement to be compared. Here, the term of "matching" means that at least a predetermined number of words (for example, 1 to 4 words) in the SQL statement to be corrected are identical to those in the SQL statement to be compared. In this way, only the SQL statements similar to the SQL statement to be corrected are narrowed as the candidates for the SQL statement to be compared, which makes it possible to extract a success log highly related to the SQL statement to be corrected.

The condition of narrowing the SQL statements for comparison is input in the filtering condition input field 44. The filtering condition input field 44 has check boxes 44A and 44B, for example.

When the check box 44A is checked, the information processing device 100 selects, from the SQL statements included in the log data 214, an SQL statement that matches the table name defined in the SQL statement to be corrected, and displays a success log corresponding to each selected SQL statement in the log list 41. In other words, among the SQL statements included in the log data 214, the success log corresponding to an SQL statement which does not match the table name defined in the SQL statement to be corrected is not displayed in the log list 41. Thus, the user may reduce the number of logs to be displayed based on the table name.

When the check box 44B is checked, the information processing device 100 selects, from the SQL statements included in the log data 214, an SQL statement that matches the instruction sentence defined in the SQL statement to be corrected, and displays a success log corresponding to each selected SQL statement in the log list 41. In other words, among the SQL statements included in the log data 214, the success log corresponding to an SQL statement which does not match the instruction sentence defined in the SQL statement to be corrected is not displayed in the log list 41. Thus, the user may reduce the number of logs to be displayed based on the instruction type.

H. Control Process of Information Processing Device 100

A control process of the information processing device 100 will be described with reference to FIG. 17. FIG. 17 is a flowchart illustrating a part of a process to be executed by the information processing device 100. The process illustrated in FIG. 17 is realized by a program to be executed by the processor 102 of the information processing device 100. In other aspects, a part of or the entire part of the process may be executed by circuit elements or other hardware.

In step S110, the processor 102 determines whether or not the instruction to be executed is an insertion instruction to insert data into the data base 430. When the processor 102 determines that the instruction to be executed is an insertion instruction to insert data into the data base 430 (YES in step S110), the processor 102 proceeds the process to step S114. Otherwise (NO in step S110), the processor 102 proceeds the process to step S112.

In step S112, the processor 102 executes the instruction.

In step S114, the processor 102 converts the type of data to be collected into the type of data on the data base 430 based on the configuration information 212 (see FIG. 7), and generates an SQL statement for data insertion. Then, the processor 102 sends the execution instruction of the SQL statement together with the generated SQL statement to the external apparatus 400. In response, the external apparatus 400 executes a data insertion process so as to insert data into the data base 430, and sends the execution result to the controller 200.

In step S116, the processor 102 receives, from the external apparatus 400, the execution result of the SQL statement generated in step S114.

In step S120, the processor 102 determines whether or not the execution result received from the external apparatus 400 is successful. When the processor 102 determines that the execution result received from the external apparatus 400 is successful (YES in step S120), the processor 102 proceeds the process to step S140. Otherwise (NO in step S120), the processor 102 proceeds the process to step S130.

In step S130, the processor 102 determines whether or not the storage of logs in the error log 215 (see FIG. 3) is enabled. The storage of logs in the error log 215 is enabled or disabled in advance. When the processor 102 determines that the storage of logs in the error log 215 is enabled (YES in step S130), the processor 102 proceeds the process to step S132. Otherwise (NO in step S130), the processor 102 proceeds the process to step S150.

In step S132, the processor 102 writes the execution result received in step S116 into the error log 215.

In step S140, the processor 102 determines whether or not the storage of logs in the success log 216 (see FIG. 3) is enabled. The storage of logs in the success log 216 is enabled or disabled in advance. When the processor 102 determines that the storage of logs in the success log 216 is enabled (YES in step S140), the processor 102 proceeds the process to step S142. Otherwise (NO in step S140), the processor 102 proceeds the process to step S150.

In step S142, the processor 102 writes the execution result received in step S116 into the success log 216.

In step S150, the processor 102 determines whether or not the executed insertion process is a test execution. For example, if the insertion process is executed by pressing the send button 56 on the edit screen 50 (see FIG. 10), the processor 102 determines that the executed insertion process is a test execution. When the processor 102 determines that the executed insertion process is a test execution (YES in step S150), the processor 102 proceeds the process to step S152. Otherwise (NO in step S150), the processor 102 proceeds the process to step S160.

In step S152, the processor 102 sends the execution result received in step S116 to the information processor 100. Thus, the execution result is displayed on the display unit 121 of the information processor 100.

In step S160, the processor 102 determines whether or not to terminate the program. The termination instruction is issued, for example, upon receipt of a termination operation from the user. When the processor 102 determines to terminate the program (YES in step S160), the processor 102 ends the process illustrated in FIG. 17. Otherwise (NO in step S160), the processor 102 returns the process to step S110.

I. Appendix

As described above, the present embodiment includes the following aspects.

[Configuration 1]

A control system comprising an information processing device (100) configured to communicate with a controller (200) configured to control a control target, any of the controller (200) and the information processing device (100) comprises a storage device (208) configured to store one or more SQL statements to be executed so as to insert data related to the control target into a data base (430) and an execution result of each of the one or more SQL statements in association with each other as log data (214), the information processing device (100) comprises:
a display unit (121);
a display control unit (145) configured to display on the display unit (121) an SQL statement to be corrected which is among the SQL statements included in the log data (214) and has an unsuccessful execution result;
an operation unit (115) configured to accept a correction operation on the SQL statement to be corrected and an execution operation on the corrected SQL statement; and
a communication unit (152) configured to send an execution instruction to execute the corrected SQL statement to the controller (200) upon receipt of the execution operation by the operation unit (115) and to receive an execution result of the corrected SQL statement from the controller (200), the display control unit (154) is configured to display an execution result of the corrected SQL statement on the display unit (121).

[Configuration 2]

The control system according to configuration 1, wherein
the operation unit (115) is further configured to accept an operation of selecting, from the SQL statements included in the log data (214), an SQL statement to be compared which has a successful execution result, and the display control unit (154) is configured to display the data inserted into the data base (430) by the SQL statement to be corrected and the data inserted into the data base (430) by the SQL statement to be compared side by side.

[Configuration 3]

The control system according to configuration 2, wherein
the display control unit (154) is configured to display a set of data satisfying a predetermined comparison condition among the entire data set composed of data inserted into the data base (430) by the SQL statement to be corrected and data inserted into the data base (430) by the SQL statement to be compared in a display mode different from the other data in the data set.

[Configuration 4]

The control system according to configuration 3, wherein
the predetermined comparison condition is satisfied when the number of digits is different between the data in the data set.

[Configuration 5]

The control system according to any one of configurations 2 to 4, wherein
the display control unit (154) is configured to display on the display unit (121) an SQL statement among the SQL statements included in the log data (214) that matches a part of the SQL statement to be corrected as a candidate of the SQL statement to be compared, and
the operation unit (115) is configured to accept a selection operation of selecting the SQL statement to be compared from the candidates.

[Configuration 6]

The control system according to configuration 5, wherein
the display control unit (154) is configured to display on the display unit (121) an SQL statement among the SQL statements included in the log data that matches a table name defined in the SQL statement to be corrected as the candidate.

[Configuration 7]

A control method of an information processing device (100) configured to communicate with a controller (200) that controls a control target, any of the controller (200) and the information processing device (100) comprises a storage device (208) configured to store one or more SQL statements to be executed so as to insert data related to the control target into a data base (430) and an execution result of each of the one or more SQL statements in association with each other as log data (214), the control method comprises:
displaying on a display unit (121) an SQL statement to be corrected which is among the SQL statements included in the log data (214) and has an unsuccessful execution result (S84);
accepting a correction operation on the SQL statement to be corrected and an execution operation on the corrected SQL statement (S86);
sending an execution instruction to execute the corrected SQL statement to the controller (200) upon receipt of the execution operation and receiving from the controller (200) an execution result of the corrected SQL statement (S90); and
displaying an execution result of the corrected SQL statement (S92) on the display unit (121).

[Configuration 8]

A control program for an information processing device (100) configured to communicate with a controller (200) that controls a control target, any of the controller (200) and the information processing device (100) includes a storage device (208) configured to store one or more SQL statements to be executed so as to insert data related to the control target into a data base (430) and an execution result of each of the one or more SQL statements in association with each other as log data (214), the control program causes the information processing device (100) to perform:
displaying on a display unit (121) an SQL statement to be corrected which is among the SQL statements included in the log data (214) and has an unsuccessful execution result (S84);
accepting a correction operation on the SQL statement to be corrected and an execution operation on the corrected SQL statement (S86);
sending an execution instruction to execute the corrected SQL statement to the controller (200) upon receipt of the execution operation and receiving from the controller (200) an execution result of the corrected SQL statement (S90); and
displaying an execution result of the corrected SQL statement (S92) on the display unit (121).

It should be understood that the embodiments disclosed herein have been presented for the purpose of illustration and description but not limited in all aspects. It is intended that the scope of the present disclosure is not limited to the description above but defined by the scope of the claims and encompasses all corrections equivalent in meaning and scope to the claims.

REFERENCE SIGNS LIST

10: control system; 30: development tool; 31: program design screen; 40, 40a: selection screen; 41: log list; 44: filtering condition input field; 44A, 44B: checkbox; 45: detail display field; 46: enter button; 47: cancel button; 50, 50A: edit screen; 51: edit field; 52, 52A: SQL statement; 53: error detail display field; 55, 55A: record information display field; 56: send button; 57A, 57B: data group; 58: result display field; 100: information processing device; 102, 202, 402: processor; 104, 206, 404: main memory; 110, 208, 410: storage device; 110a: development support program; 111, 201, 412: communication interface; 114, 414: interface; 115, 415: operation unit; 120, 420: display interface; 121, 421: display unit; 125, 425: internal bus; 152: communication unit; 154: display control unit; 200: controller; 204: chipset; 209: system program; 210: user program; 210a: sequence program; 210b: motion program; 211: control program; 212: configuration information; 214: log data; 215: error log; 216: success log; 222: internal bus controller; 224: field bus controller; 226: I/O unit; 239: memory card interface; 240: memory card; 300: drive apparatus; 300A, 300B: servo driver; 400: external apparatus; 416: field bus interface; 430: data base; 432: table

The invention claimed is:

1. A control system comprising an information processing device configured to communicate with a controller configured to control a control target,
  any of the controller and the information processing device comprising a storage device configured to store one or more SQL statements to be executed so as to insert data related to the control target into a data base and an execution result of each of the one or more SQL statements in association with each other as log data,
  the information processing device comprising:
    a display unit;
    a display control unit configured to display on the display unit an SQL statement to be corrected which is among the SQL statements included in the log data and has an unsuccessful execution result;
    an operation unit configured to accept a correction operation on the SQL statement to be corrected and an execution operation on the corrected SQL statement; and
    a communication unit configured to send an execution instruction to execute the corrected SQL statement to the controller upon receipt of the execution operation by the operation unit and to receive an execution result of the corrected SQL statement from the controller,
  the display control unit being configured to display an execution result of the corrected SQL statement on the display unit.

2. The control system according to claim 1, wherein
  the operation unit is further configured to accept an operation of selecting, from the SQL statements included in the log data, an SQL statement to be compared which has a successful execution result, and
  the display control unit is configured to display the data inserted into the data base by the SQL statement to be corrected and the data inserted into the data base by the SQL statement to be compared side by side.

3. The control system according to claim 2, wherein
  the display control unit is configured to display a set of data satisfying a predetermined comparison condition among the entire data set composed of data inserted into the data base by the SQL statement to be corrected and data inserted into the data base by the SQL statement to be compared in a display mode different from the other data in the data set.

4. The control system according to claim 3, wherein
  the predetermined comparison condition is satisfied when the number of digits is different between the data in the data set.

5. The control system according to claim 2, wherein
  the display control unit is configured to display on the display unit an SQL statement among the SQL statements included in the log data that matches a part of the SQL statement to be corrected as a candidate of the SQL statement to be compared, and
  the operation unit is configured to accept a selection operation of selecting the SQL statement to be compared from the candidates.

6. The control system according to claim 5, wherein
  the display control unit is configured to display on the display unit an SQL statement among the SQL statements included in the log data that matches a table name defined in the SQL statement to be corrected as the candidate.

7. A control method of an information processing device configured to communicate with a controller that controls a control target,
  any of the controller and the information processing device comprising a storage device configured to store one or more SQL statements to be executed so as to insert data related to the control target into a data base and an execution result of each of the one or more SQL statements in association with each other as log data,
  the control method comprising:
    displaying on the display unit an SQL statement to be corrected which is among the SQL statements included in the log data and has an unsuccessful execution result;
    accepting a correction operation on the SQL statement to be corrected and an execution operation on the corrected SQL statement;
    sending an execution instruction to execute the corrected SQL statement to the controller upon receipt of the execution operation and receiving from the controller an execution result of the corrected SQL statement; and
    displaying an execution result of the corrected SQL statement on the display unit.

8. The control method according to claim 7, further comprising:
  accepting an operation of selecting, from the SQL statements included in the log data, an SQL statement to be compared which has a successful execution result, and
  displaying the data inserted into the data base by the SQL statement to be corrected and the data inserted into the data base by the SQL statement to be compared side by side.

9. The control method according to claim 8, further comprising:
displaying a set of data satisfying a predetermined comparison condition among the entire data set composed of data inserted into the data base by the SQL statement to be corrected and data inserted into the data base by the SQL statement to be compared in a display mode different from the other data in the data set.

10. The control method according to claim 9, wherein the predetermined comparison condition is satisfied when the number of digits is different between the data in the data set.

11. The control method according to claim 8, further comprising:
displaying on the display unit an SQL statement among the SQL statements included in the log data that matches a part of the SQL statement to be corrected as a candidate of the SQL statement to be compared, and
accepting a selection operation of selecting the SQL statement to be compared from the candidates.

12. The control method according to claim 11, further comprising:
displaying on the display unit an SQL statement among the SQL statements included in the log data that matches a table name defined in the SQL statement to be corrected as the candidate.

13. A non-transitory computer-readable storage medium having stored thereon an executable control program for an information processing device configured to communicate with a controller that controls a control target,
any of the controller and the information processing device comprising a storage device configured to store one or more SQL statements to be executed so as to insert data related to the control target into a data base and an execution result of each of the one or more SQL statements in association with each other as log data,
the control program causing the information processing device to perform:
displaying on a display unit an SQL statement to be corrected which is among the SQL statements included in the log data and has an unsuccessful execution result;
accepting a correction operation on the SQL statement to be corrected and an execution operation on the corrected SQL statement;
sending an execution instruction to execute the corrected SQL statement to the controller upon receipt of the execution operation and receiving from the controller an execution result of the corrected SQL statement; and
displaying an execution result of the corrected SQL statement on the display unit.

14. The non-transitory computer-readable storage medium according to claim 13, wherein
the control program causes the information processing device to further perform:
accepting an operation of selecting, from the SQL statements included in the log data, an SQL statement to be compared which has a successful execution result, and
displaying the data inserted into the data base by the SQL statement to be corrected and the data inserted into the data base by the SQL statement to be compared side by side.

15. The non-transitory computer-readable storage medium according to claim 14, wherein
the control program causes the information processing device to further perform:
displaying a set of data satisfying a predetermined comparison condition among the entire data set composed of data inserted into the data base by the SQL statement to be corrected and data inserted into the data base by the SQL statement to be compared in a display mode different from the other data in the data set.

16. The non-transitory computer-readable storage medium according to claim 15, wherein
the predetermined comparison condition is satisfied when the number of digits is different between the data in the data set.

17. The non-transitory computer-readable storage medium according to claim 14, wherein
the control program causes the information processing device to further perform:
displaying on the display unit an SQL statement among the SQL statements included in the log data that matches a part of the SQL statement to be corrected as a candidate of the SQL statement to be compared, and
accepting a selection operation of selecting the SQL statement to be compared from the candidates.

18. The non-transitory computer-readable storage medium according to claim 17, wherein
the control program causes the information processing device to further perform:
displaying on the display unit an SQL statement among the SQL statements included in the log data that matches a table name defined in the SQL statement to be corrected as the candidate.

* * * * *